US012145354B2

(12) United States Patent
Sawase et al.

(10) Patent No.: US 12,145,354 B2
(45) Date of Patent: Nov. 19, 2024

(54) HEATING DEVICE, DRYER, LIQUID DISCHARGE APPARATUS, AND PRINTER

(71) Applicants: Hiroshi Sawase, Kanagawa (JP); Kazuaki Kamihara, Tokyo (JP); Ryusaku Hida, Kanagawa (JP); Masato Ogawa, Kanagawa (JP); Kohki Asada, Tokyo (JP); Yoshihiro Takahashi, Tokyo (JP)

(72) Inventors: Hiroshi Sawase, Kanagawa (JP); Kazuaki Kamihara, Tokyo (JP); Ryusaku Hida, Kanagawa (JP); Masato Ogawa, Kanagawa (JP); Kohki Asada, Tokyo (JP); Yoshihiro Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 191 days.

(21) Appl. No.: 18/074,612

(22) Filed: Dec. 5, 2022

(65) Prior Publication Data

US 2023/0108116 A1 Apr. 6, 2023

Related U.S. Application Data

(63) Continuation of application No. 17/232,758, filed on Apr. 16, 2021, now Pat. No. 11,559,997.

(30) Foreign Application Priority Data

May 29, 2020 (JP) ................................ 2020-095048
Feb. 11, 2021 (JP) ................................ 2021-020325

(51) Int. Cl.
*B41J 11/00* (2006.01)

(52) U.S. Cl.
CPC ...... *B41J 11/00216* (2021.01); *B41J 11/0022* (2021.01); *B41J 11/007* (2013.01)

(58) Field of Classification Search
CPC . B41J 11/00216; B41J 11/0022; B41J 11/007; B41J 11/00242; B41J 11/00214
See application file for complete search history.

(56) References Cited

U.S. PATENT DOCUMENTS

2013/0044169 A1 2/2013 Chiwata
2021/0197585 A1* 7/2021 Hase .......................... B41J 3/60

FOREIGN PATENT DOCUMENTS

JP 2013039820 A 2/2013
JP 2014069367 A 4/2014

OTHER PUBLICATIONS

Japanese office action; Application 2021-020325; Sep. 10, 2024.

* cited by examiner

*Primary Examiner* — Bradley W Thies
(74) *Attorney, Agent, or Firm* — Duft & Bornsen, PC

(57) ABSTRACT

A heating device includes a conveyor configured to convey a sheet, the sheet having a first surface on which a liquid is applied and a second surface contacting the conveyor, a first heater facing the first surface opposite to the second surface of the sheet, the first heater configured to heat the sheet, and a second heater configured to heat the conveyor.

21 Claims, 19 Drawing Sheets

| TEMPERATURE OF SHEET (℃) | DRYING PROPERTY | WRINKLES IN SHEET |
|---|---|---|
| 110 | GOOD | POOR |
| 90 | GOOD | AVERAGE |
| 70 | GOOD | GOOD |
| 50 | AVERAGE | GOOD |
| 30 | POOR | GOOD |

| | CONDITION A | CONDITION B |
|---|---|---|
| 1. LINEAR CONVEYANCE VELOCITY | HIGH SPEED | LOW SPEED |
| 2. PAPER TYPE | PAPER BOARD | COATED PAPER |
| 3. PAPER THICKNESS | THICK | THIN |
| 4. TARGET TEMPERATURE OF BELT | 121°C | 76°C |
| 5. TARGET TEMPERATURE OFSHEET | 70°C | 70°C |

FIG. 19

| PRINT MODE | APPLICATION OF PRE-TREATMENT | PAPER TYPE | BASIC WEIGHT (THICKNESS) | OUTPUT OF FIRST HEATER (%) | TARGET TEMPERATURE OF HEAT TRANSFER DEVICE (°C) |
|---|---|---|---|---|---|
| HIGH SPEED | NOT APPLIED | COATED PAPER | SMALL (THIN) | 70 | 88 |
| | | | LARGE (THICK) | 80 | 99 |
| | | PLAIN PAPER | SMALL (THIN) | 60 | 85 |
| | | | LARGE (THICK) | 70 | 96 |
| | | PAPER BOARD | LARGE (THICK) | 90 | 121 |
| | APPLIED | COATED PAPER | SMALL (THIN) | 75 | 88 |
| | | | LARGE (THICK) | 85 | 99 |
| | | PLAIN PAPER | SMALL (THIN) | 65 | 85 |
| | | | LARGE (THICK) | 75 | 96 |
| | | PAPER BOARD | LARGE (THICK) | 95 | 121 |
| LOW SPEED | NOT APPLIED | COATED PAPER | SMALL (THIN) | 66 | 79 |
| | | | LARGE (THICK) | 76 | 88 |
| | | PLAIN PAPER | SMALL (THIN) | 57 | 77 |
| | | | LARGE (THICK) | 66 | 85 |
| | | PAPER BOARD | LARGE (THICK) | 85 | 107 |
| | APPLIED | COATED PAPER | SMALL (THIN) | 71 | 79 |
| | | | LARGE (THICK) | 80 | 88 |
| | | PLAIN PAPER | SMALL (THIN) | 61 | 77 |
| | | | LARGE (THICK) | 71 | 85 |
| | | PAPER BOARD | LARGE (THICK) | 90 | 107 |

HEATING DEVICE, DRYER, LIQUID DISCHARGE APPARATUS, AND PRINTER

CROSS-REFERENCE TO RELATED APPLICATIONS

This patent application is a continuation of U.S. patent application Ser. No. 17/232,758, filed Apr. 16, 2021, which claims priority pursuant to 35 U.S.C. § 119(a) to Japanese Patent Application No. 2020-095048, filed on May 29, 2020, in the Japan Patent Office and Japanese Patent Application No. 2021-020325, filed on Feb. 11, 2021, in the Japan Patent Office, the entire disclosures of which are hereby incorporated by reference herein.

BACKGROUND

Technical Field

Aspects of the present disclosure relate to a heating device, a dryer, a liquid discharge apparatus, and a printer.

Related Art

A printer applies a liquid onto a print target such as a sheet. The printer includes a heater to heat the sheet on which the liquid is applied to accelerate drying of the liquid applied on the sheet.

The printer includes a conveyance belt, an irradiator, and the heater. The conveyance belt conveys a recording medium on which a photocurable ink is applied. The irradiator irradiates the recording medium mounted and conveyed by the conveyance belt with ultraviolet rays to cure the photocurable ink on the recording medium. The heater is disposed upstream of the irradiator. The heater heats the photocurable ink applied onto the recording medium.

SUMMARY

In an aspect of this disclosure, a heating device includes a conveyor configured to convey a sheet, the sheet having a first surface on which a liquid is applied and a second surface contacting the conveyor, a first heater facing the first surface opposite to the second surface of the sheet, the first heater configured to heat the sheet, and a second heater configured to heat the conveyor.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein:

FIG. 19 is a table illustrating an example of the heat control of the heating device according to the sixth embodiment of the present disclosure;

Figure 1:
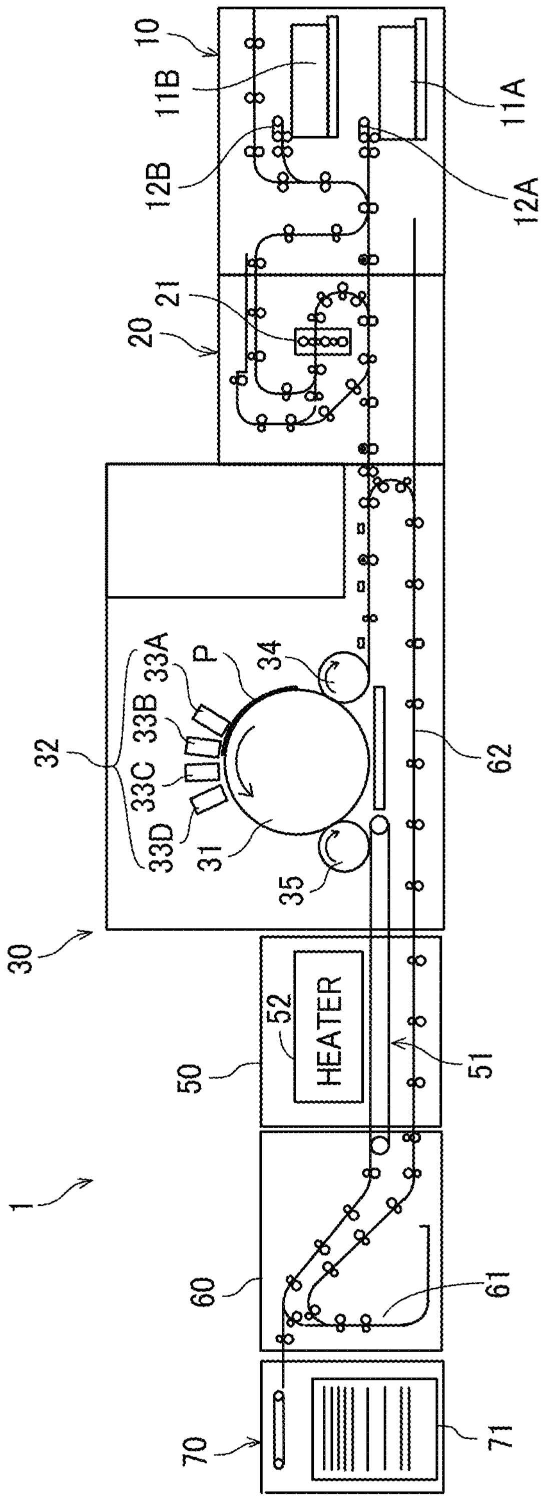
FIG. 1 is a schematic cross-sectional side view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Referring now to the drawings, wherein like reference numerals designate identical or corresponding parts throughout the several views, embodiments of the present disclosure are described below. A printer 1 as a liquid discharge apparatus according to a first embodiment of the present disclosure is described with reference to FIGS. 1 and 2.

FIG. 1 is a schematic side view of the printer 1 according to the first embodiment.

Figure 2:
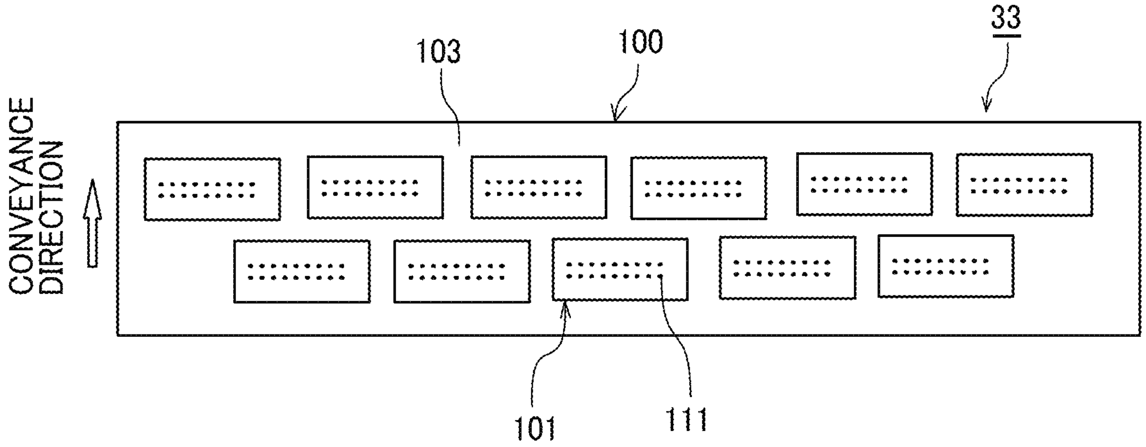
FIG. 2 is a plan view of a discharge unit of the printer.

FIG. 2 is a schematic plan view of a discharge unit of the printer 1.

The printer 1 according to the first embodiment includes a loading unit 10 to load a sheet P into the printer 1, a pretreatment unit 20, a printing unit 30, a dryer 50, a reverse mechanism 60, and an ejection unit 70. The pretreatment unit 20 serves as a liquid applier to apply a pretreatment liquid onto the sheet P.

In the printer 1, the pretreatment unit 20 applies, as required, a pretreatment liquid as an application liquid onto the sheet P fed (supplied) from the loading unit 10, the printing unit 30 applies a desired liquid onto the sheet P to perform required printing.

After the printer 1 dries the liquid adhering to the sheet P by the dryer 50, the printer 1 ejects the sheet P to the ejection unit 70 through the reverse mechanism 60 without printing on a back surface of the sheet P. The printer 1 may also print on both sides of the sheet P via the reversing mechanism 60 after the printer 1 dries the liquid adhering to the sheet P by the dryer 50, and the printer 1 then ejects the sheet P to the ejection unit 70.

The loading unit 10 includes loading trays 11 (a lower loading tray 11A and an upper loading tray 11B) to accommodate a plurality of sheets P and feeding devices 12 (a feeding device 12A and a feeding device 12B) to separate and feed the sheets P one by one from the loading trays 11.

The loading unit 10 supplies the sheets P to the pretreatment unit 20.

The pretreatment unit 20 includes, e.g., a coater 21 as a treatment-liquid application unit applies a treatment liquid onto the sheet P to coat a printing surface of the sheet P with the treatment liquid having an effect of aggregation of ink particles to prevent bleed-through.

The printing unit 30 includes a drum 31 and a liquid discharge device 32. The drum 31 is a bearer (rotating member) that bears the sheet P on a circumferential surface of the drum 31 and rotates. The liquid discharge device 32 discharges liquid toward the sheet P borne on the drum 31.

The printing unit 30 includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the dryer 50.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position opposite (facing) the drum 31.

Similarly, the drum 31 includes a sheet gripper on a surface of the drum 31, and the leading end of the sheet P is gripped by the sheet gripper of the drum 31. The drum 31 includes a plurality of suction holes dispersed on a surface of the drum 31, and a suction unit generates suction airflows directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows by the suction device. As the drum 31 rotates, the sheet P is conveyed.

The liquid discharge device 32 includes discharge units 33 (discharge units 33A to 33D) to discharge liquids onto the sheet P as a liquid application unit. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K).

Further, a discharge unit may discharge a special liquid, that is, a liquid of spot color such as white, gold, or silver.

As illustrated in FIG. 2, for example, each of the discharge unit 33 includes a head module 100 including a full line head. The head module 100 includes a plurality of liquid discharge heads 101 arranged in a staggered manner on a base 103. Each of the liquid discharge head 101 includes a plurality of nozzle rows, and a plurality of nozzles 111 is arranged in each of the nozzle rows. Hereinafter, the liquid discharge head 101 is simply referred to as the "head 101." The head 101 discharges a liquid from the nozzles 111.

The printing unit 30 controls a discharge operation of each discharge unit 33 of the liquid discharge device 32 by a drive signal corresponding to print data. When the sheet P borne on the drum 31 passes through a region facing the liquid discharge device 32, the liquids of respective colors are discharged from the discharge units 33 toward the sheet P, and an image corresponding to the print data is formed on the sheet P.

The dryer 50 serving as a drying device includes a heater 52. The dryer 50 heats and dries the sheet P, on which the liquid is applied, conveyed by a conveyor 51.

The reverse mechanism 60 includes a reverse part 61 and a duplex conveyor 62. The reverse mechanism 60 reverses the sheet P that has passed through the dryer 50 to dry a first surface of the sheet P onto which the liquid is applied when the printer 1 performs a duplex printing. The duplex conveyor 62 feeds the reversed sheet P back to upstream of the transfer cylinder 34 of the printing unit 30. The reverse part 61 reverses the sheet P by switchback manner.

The ejection unit 70 includes an ejection tray 71 on which a plurality of sheets P is stacked. The plurality of sheets P conveyed from the reverse mechanism 60 is sequentially stacked and held on the ejection tray 71.

In the present embodiment, an example in which the sheet is a cut sheet is described. However, embodiments of the present disclosure can also be applied to an apparatus using a continuous medium (web) such as continuous paper or roll paper, an apparatus using a sheet material such as wallpaper, and the like.

A heater according to a first embodiment of the present disclosure is described with reference to FIGS. 3 and 4.

Figure 3:
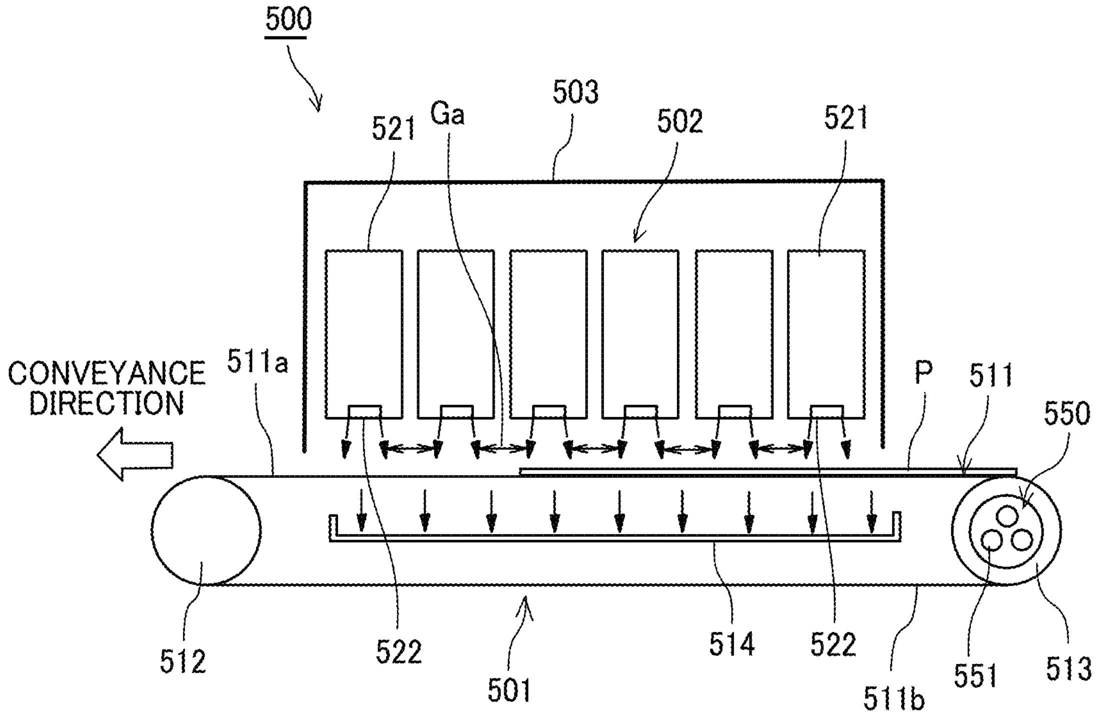
FIG. 3 is a schematic cross-sectional side view of a heating device according to the first embodiment of the present disclosure.

FIG. 3 is a schematic cross-sectional side view of the heating device 500 according to the first embodiment of the present disclosure.

Figure 4:
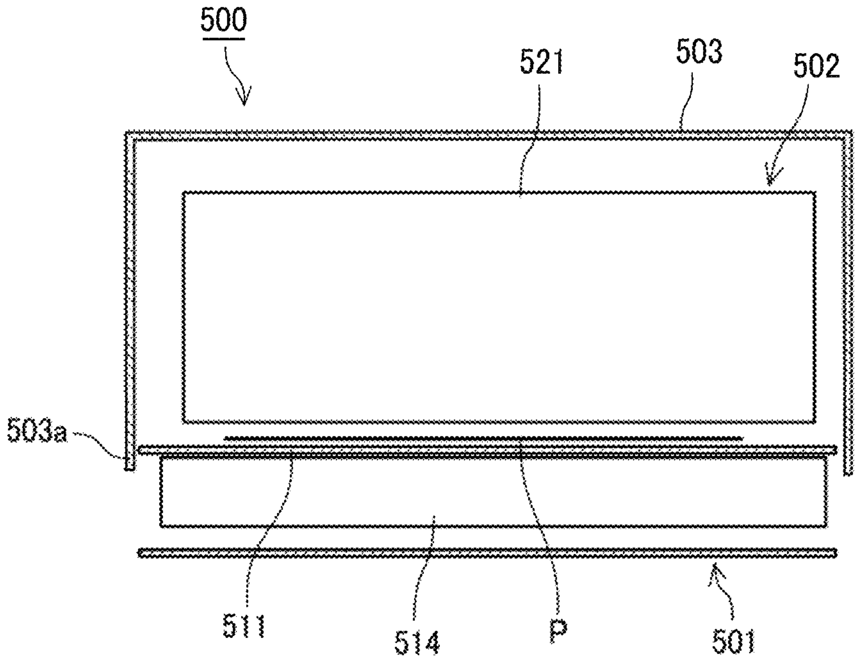
FIG. 4 is a schematic cross-sectional front view of the heating device of FIG. 1.

FIG. 4 is a schematic cross-sectional front view of the heating device 500 according to the first embodiment of the present disclosure.

The heater 52 of the dryer 50 includes a heating device 500. The heating device 500 includes a conveyance mechanism 501 to configure the conveyor 51 and a first heater 502 serving as a dryer. The conveyance mechanism 501 serves as a conveyor. The heating device 500 according to the first embodiment configures a dryer 50. The conveyance mechanism 501 configures the conveyor 51. The first heater 502 configures the heater 52.

The conveyance mechanism 501 includes a conveyance belt 511 that bears and conveys the sheet P. The conveyance belt 511 is an endless conveyor. The conveyance belt 511 is an endless belt stretched between a drive roller 512 and a driven roller 513. The conveyance belt 511 orbits and rotates to move the sheet P. The conveyance mechanism 501 according to the first embodiment includes a mechanism to convey the sheet P from the printing unit 30 to the reverse mechanism 60 across the dryer 50 as illustrated in FIG. 1.

The conveyance belt 511 is a belt that includes a plurality of openings from which an air is sucked by a suction chamber 514 arranged inside the conveyance belt 511. The conveyance belt 511 may be, for example, a mesh belt, a plain weave belt having a suction hole, or the like. The suction chamber 514 includes a suction blower, a fan, or the like to sucks the air through the plurality of openings in the conveyance belt 511 to attract the sheet P to the conveyance belt 511.

The conveyance mechanism 501 (conveyor) is not limited to a conveyor that uses suction method to attract the sheet P as described above. The conveyance mechanism 501 (conveyor) may attract and convey the sheet P on the conveyance belt 511 by, for example, an electrostatic adsorption method or a gripping method using a gripper.

The first heater 502 includes a plurality of ultraviolet irradiators 521 arranged in a housing 503 along a conveyance direction of the sheet P as indicated by arrow in FIG. 3. The ultraviolet irradiators 521 irradiate the sheet P conveyed by the conveyance mechanism 501 with ultraviolet rays to heat the sheet P.

As illustrated in FIG. 3, the housing 503 is arranged to have a gap with the conveyance belt 511 in a vertical direction and a direction along the conveyance direction of the sheet P. The housing 503 includes an extension portion *503a* extended lower than conveyance belt 511 in a vertical (height) direction perpendicular to the conveyance direction of the sheet P.

Next, an example of the ultraviolet irradiator 521 is described with reference to FIG. 5.

Figure 5:
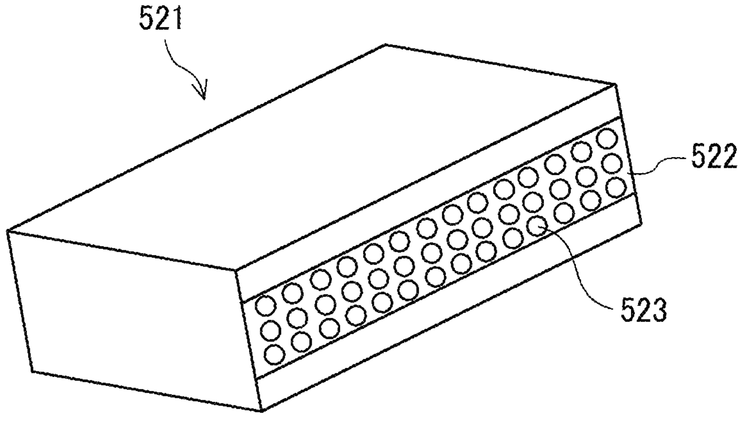
FIG. 5 is a schematic perspective view of an example of the ultraviolet irradiator.

FIG. 5 is a schematic perspective view of an example of the ultraviolet irradiator 521.

The ultraviolet irradiator 521 includes granular ultraviolet-light emitting diode (UV-LED) elements 523 arranged in a grid pattern on an irradiation surface 522 of the ultraviolet irradiator 521. Since the UV-LED elements 523 emit light at an identical illuminance, the ultraviolet irradiator 521 uniformly emits light along the irradiation surface 522 as a whole.

As a wavelength of the ultraviolet light (UV light), a wavelength having a peak wavelength of 395 nm and a wavelength distribution having a full width at half maximum of about 15 nm is used. However, the wavelength and wavelength distribution of the ultraviolet light (UV light) is not limited the wavelength as described above and may be any other wavelength.

Thus, the ultraviolet irradiator 521 can obtain an effect of selectively heating only an image part (a part onto which the liquid is applied) and not excessively raising a temperature of a blank part (a part onto which the liquid is not applied).

A result of comparison between the UV-LED elements 523 and an infrared heater (infrared lamp) is illustrated below. The infrared heater (infrared lamp) is also referred to as an IR heater (IR lamp).

A surface temperature of the sheet P after the sheet P has passed through the dryer is measured while heating conditions (output settings of the IR lamp and the UV-LED elements 523) are varied to measure the temperatures of the image part and the blank part.

When the temperature of the image part rose to around 90° C., moisture and solvent in a water-based ink evaporated and dried.

When the IR lamp heats the sheet P with a setting in which the temperature of the image part in the sheet P became 90° C., the temperature of the blank part in the sheet P become 105° C. at the same time of heating the image part.

Conversely, when the UV-LED elements 523 heats the sheet P with the setting in which the temperature of the image part become 90° C. as in a case of the IR lamp, the temperature of the blank part in the sheet P become 45° C. that is about 60° C. lower than the temperature of the blank part heated by the IR lamp.

Due to such a difference in the temperature of the blank part, moisture content of the blank part decreased from 6.10% to 1.4% by the heating of the IR lamp, whereas the moisture content of the blank part decreased only from 6.1% to 2.9% in the heating of the UV-LED elements 523.

That is, it was confirmed that the sheet P can retain more moisture in the blank part of the sheet P after the sheet P is heated (dried) by the ultraviolet ray emitted from the UV-LED elements 523.

Referring to FIG. 3 again, the heating device 500 includes a heating element 551 in the driven roller 513 of the conveyance mechanism 501. The heating element 551 forms a second heater 550 to heat the driven roller 513 to heat the conveyance belt 511. The conveyance belt 511, the drive roller 512, and the driven roller 513 forms a conveyor. Thus, the heating element 551 of the second heater 550 heats the conveyor.

Here, a portion of the conveyance belt 511 that moves in the conveyance direction is referred to as a forward portion 511*a*. The portion of the conveyance belt 511 is a portion on which the sheet P is placed and moves. The surface of the forward portion 511*a* is also referred to as a "conveyance surface of the sheet P."

The second heater 550 is arranged opposite to the first heater 502 with respect to the conveyance surface of the conveyance belt 511 contacting the second surface (back surface) of the sheet P opposite to the first surface (front surface) of the sheet P.

Here, the term "opposite" is not limited to the second heater 550 facing the first heater 502.

The heating element 551 of the second heater 550 is, for example, a heater including an infrared heater (IR lamp) or the like. The heating element 551 of the second heater 550 heats an interior of the driven roller 513 to heat a conveyance member such as the conveyance belt 511 in contact with the driven roller 513.

The infrared heater as the heating element 551 is, for example, a carbon heater, a tungsten heater, a halogen heater, a ceramic heater, and the like, but is not limited to the heaters as described above and may be any other types of heaters.

Further, the heating element 551 (second heater 550) arranged inside the driven roller 513 can efficiently transfer heat of the heating element 551 to the surface of the driven roller 513 in an outer peripheral direction without leaking of the heat.

In the heating device 500 according to the first embodiment, the sheet P fed onto the conveyance belt 511 from upstream of the conveyance belt 511 is attracted to the conveyance belt 511 by suction force generated by the suction chamber 514.

The heating element 551 inside the driven roller 513 heats the driven roller 513 so that the heating element 551 heats a portion of the conveyance belt 511 that passes from the driven roller 513 to the housing 503.

Thus, the sheet P attracted to and contacted with the conveyance belt 511 receives heat transfer from the conveyance belt 511, and the temperature of the sheet P increases. That is, the conveyance belt 511 serves as a heat transfer device to transfer the heat generated by the heating element 551 of the second heater 550 to the sheet P.

The plurality of ultraviolet irradiators 521 of the first heater 502 irradiate the sheet P with ultraviolet rays so that the ink as a liquid applied to the sheet P absorbs the ultraviolet rays. The pigment in the ink generates heat that evaporates solvent and moisture in the ink and dries the ink.

In this way, the pigment in the liquid (ink) generates heat while the temperature rises due to heat transfer from the conveyance belt 511 as the conveyance member to the sheet P. Thus, the heating device 500 can efficiently heat the ink (liquid) applied onto the sheet P to fix the image on the sheet P.

Thus, the heating device 500 includes the conveyor 51 configured to convey the sheet P on which a liquid is applied, the first heater 502 configured to heat the liquid on a first surface (upper surface or front surface in FIG. 3) of the sheet P conveyed by the conveyor 51, and a second heater 550 configured to heat the conveyor 51 contacting a second surface (lower surface or back surface in FIG. 3) of the sheet P opposite to the first surface of the sheet P.

Conversely, in a heating device that does not have the second heater 550 to heat the conveyance member, the pigments in the ink generates heat while the temperature of the sheet P does not rise.

At the time of generation on heat by the pigments, a phenomenon of heat transfer from the pigment in the ink to the sheet P and the conveyance member occurs since temperature of the sheet P and the conveyance member is relatively lower than temperature of the image portion even if the temperature of the image portion (the portion to which the liquid is applied) rises due to the generation of heat by the pigment.

Thus, temperature rise of the sheet P is suppressed.

Therefore, if a configuration is adopted in which an output of the ultraviolet irradiators 521 is increased or a number of the ultraviolet irradiators 521 is increased to increase thermal energy, a power consumption of the heating device 500 increases and a size of an apparatus body of the heating device 500 increases.

Thus, the heating device 500 according to the first embodiment uses the heating element 551 of the second heater 550 to heat the conveyance belt 511 as the conveyance member that contacts the sheet P to heat the sheet P. Thus, the heating device 500 can efficiently increase the temperature of the sheet P conveyed from upstream of the heating device 500.

Thus, the heating device 500 can prevent or reduce the heat of the image portion generated by the ultraviolet irradiation to be transferred to the sheet P or the conveyance member. Therefore, the heating device 500 can effectively apply heat of the image portion to an evaporation phenomenon of the solvent and water in the ink.

Thus, the heating device 500 can reduce the output of the ultraviolet irradiators 521 and reduce the number of the ultraviolet irradiators 521. Thus, the heating device 500 can reduce the power consumption and the size of the apparatus body of the heating device 500. Further, the heating device 500 can apply heat from the conveyance belt 511 (conveyance member) to the sheet P and the image portion so that the heating device 500 can further promote the evaporation phenomenon of the solvent and water in the ink.

Further, if the heating device 500 includes an array of a large number of ultraviolet irradiators 521, it is difficult to install the ultraviolet irradiators 521 in the heating device 500, such that the irradiation surfaces 522 of the ultraviolet irradiators 521 are continuously without joint along the conveyance direction, physically and in terms of layout.

Therefore, a section Ga illustrated in FIG. 3 may be generated. The ultraviolet ray is not irradiated, or illuminance is weakened, in the section Ga. In this section Ga, the temperature of the image portion may drop.

Conversely, the heating device 500 according to the first present embodiment heats the conveyance belt 511 as the conveyance member to increase the temperature of the conveyance belt 511 so that the sheet P can be warmed. Thus, the heating device 500 can prevent temperature drop of the image portion in the sheet P and efficiently dries the ink (liquid) applied on the sheet P.

Next, an effect of the heating device 500 according to the first embodiment is illustrated with reference to FIGS. 6 and 7.

Figures 6, 7:
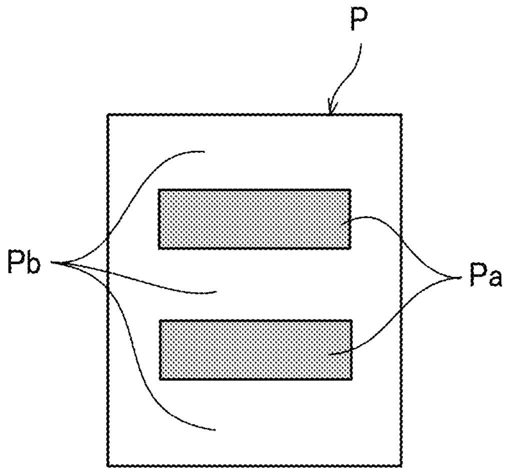
FIG. 6 is a table illustrating an effect of the heating device according to the first embodiment.
FIG. 7 is a schematic plan view of a sheet on which a liquid is discharged to illustrate the effect of the heating device according to the first embodiment.

FIG. 6 is a table illustrating the effect of the heating device 500.

FIG. 7 is a schematic plan view of the sheet P on which a liquid is discharged to form an image on the sheet P. In FIG. 6, the sheet P is referred to as a "sheet."

FIG. 6 illustrates an evaluation result of a relation between a drying property of the image portion Pa of the sheet P and wrinkles in the sheet P, and the temperature of the sheet P when an output of the heating element 551 of the second heater 550 is controlled so that the temperature of the sheet P changes from 30 to 110° C.

At this time, an output of the ultraviolet irradiators 521, a conveyance speed of the sheet P, an amount of ink (application amount of liquid) of the image portion Pa of the sheet P, and the like are all set to the same conditions.

As illustrated in FIG. 7, the sheet P as an output material (sample) used at this time has the image portion Pa and the blank portion Pb arranged alternately.

The drying property of the image portion Pa is evaluated by drying the sheet P of the sample by the heating device 500, lapping another sheet P (rubbing side) on the image portion Pa (rubbed side), rubbing the image portion P under predetermined conditions, and then checking a density of the image portion Pa adhered on the rubbing side of the another sheet P to evaluate a degree of peeling of an image on the sheet P.

If the drying property is within a predetermined standard, it is determined that the image portion Pa of the sheet P is sufficiently dry.

In FIG. 6, "good" indicates that a degree of peeling of image is within a predetermined standard, and the sheet P is sufficiently dry. In FIG. 6, "average" indicates that the degree of peeling of the image on the sheet P is slightly exceeds the predetermined standard. In FIG. 6, "poor" indicates that the degree of peeling of the image on the sheet P greatly exceeds the predetermined standard, and the drying is insufficient.

The wrinkles of the sheet P are observed by drying the sheet P of the sample by the heating device 500, scanning a surface shape of a region of the blank portion Pb by a laser displacement meter or the like, and converting the surface shape into data of unevenness. Then, a height of unevenness and a number of peaks of the unevenness of the wrinkles are calculated. Based on the above calculation, it is determined that the sheet P is not deformed (no wrinkles) if a deformation (wrinkles) of the sheet P is within the predetermined standard.

In FIG. 6, "good" indicates that no wrinkle is observed, or some wrinkles are observed but within a predetermined standard. In FIG. 6, "average" indicates that some wrinkles are observed, and a number of the wrinkles slightly exceeds the predetermined standard. In FIG. 6, "poor" indicates that wrinkles are remarkable, and the number of the wrinkles greatly exceeds the predetermined standard.

From the results illustrated in FIG. 6, the drying property improves as the temperature of the sheet P increases. This is because the higher the temperature, the better the water and solvent in the ink evaporate. Further, components such as resin contained in the ink are well dissolved to protect the image surface of the image portion Pa of the sheet P as the temperature of the sheet P increases.

On the other hand, the wrinkles of the sheet P greatly increase and become remarkable as the temperature of the sheet P increases. That is, the deformation of the sheet P increases as the temperature of the sheet P increases. The heating device 500 fully dries not only moisture in the image portion Pa but also moisture in the blank portion Pb of the sheet P such that the temperature of the sheet P approaches 100° C. or slightly exceeds 100° C. but does not exceed 110° C.

Then, if the sheet P as the sample is left for a long time, the blank portion Pb gradually absorbs the moisture in an atmosphere and breaks hydrogen bonds of cellulose inside the sheet P. Thus, the blank portion Pb of the sheet P may be stretched. Particularly, as illustrated in FIG. 7, the wrinkles appear remarkably in a region such as the blank portion Pb sandwiched between the image portions Pa.

From the above-described results, the heating device 500 preferably controls a temperature of the conveyance belt 511 and a heating temperature of the first heater 502 to a temperature in which the temperature of the sheet P in the heating device 500 does not exceed 100° C.

Further, in an example illustrated in FIG. 7, a belt temperature of the conveyance belt 511 is controlled so that the temperature of the sheet P becomes 70° C. Thus, the sheet P is sufficiently dried, and an occurrence of wrinkles in the sheet P can be reduced.

Next, the ink used in the present embodiment are described in detail below.

A water-based pigment ink is used as the liquid to be discharged from the head 101. A typical composition of the water-based pigment ink is about 90% water and other high boiling point solvents, about 5% resin, and about 5% pigment colorant.

Specifically, as a colorant of the pigment, carbon black may be used for black (K), copper phthalocyanine may be used for cyan (C), quinacridone may be used for magenta (M), and monoazo yellow may be used for yellow (Y), for example. Using such colorants of the pigment, the printer 1 can obtain (print) a vivid printed image that does not fade even when the printed image is irradiated with ultraviolet light by the ultraviolet irradiator 521 unlike an ink using a colorant of dye.

In so-called water-based pigment ink, above-mentioned colorant of the pigment absorbs ultraviolet light and converts the ultraviolet light into heat energy to generate heat. As the temperature of the ink rises, water and other high-boiling solvent evaporate. As a result of melting of the resin, the printed image is fixed on the sheet P.

In such a drying process of the water-based pigment ink, safety is easily ensured because there are sufficiently few or no substances in an active state. Further, the water-based pigment ink has an advantage of reducing a running cost of the ink because a high-cost material such as a polymerization initiator and a polymerization monomer contained in the so-called ultraviolet curable ink is unnecessary.

In addition to the water-based pigment ink, if an ink contains a pigment such as an oil-based pigment ink, a similar effect as in the first embodiment can be obtained.

The heating device 500 according to a second embodiment of the present disclosure is described with reference to FIG. 8.

Figure 8:
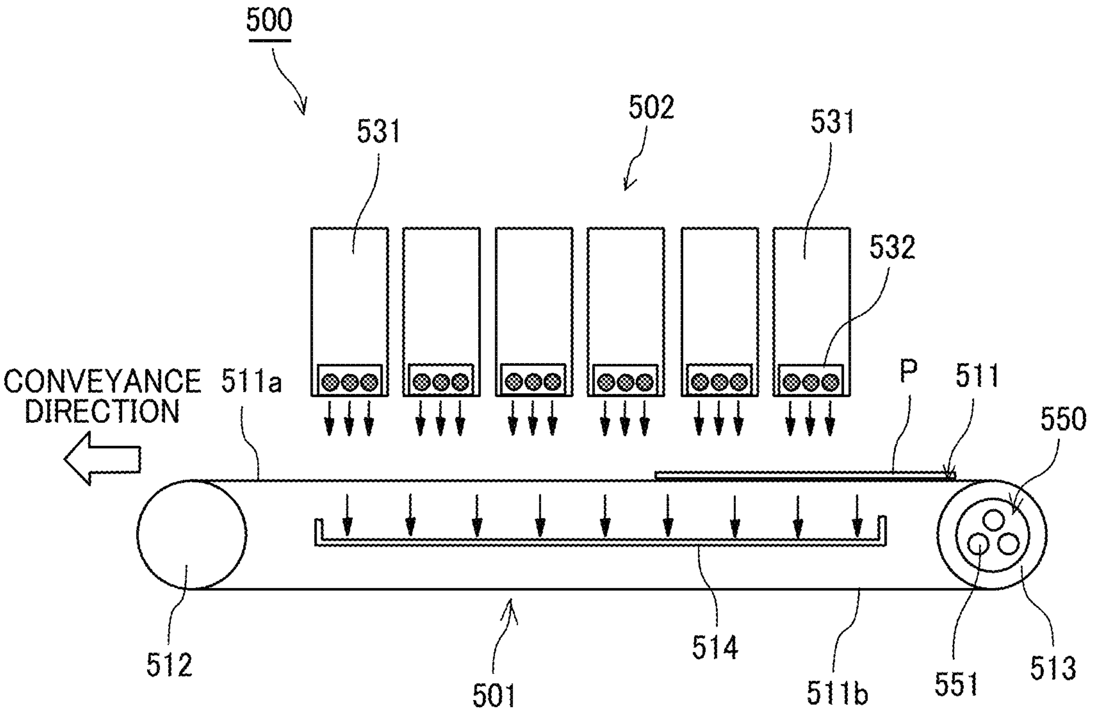
FIG. 8 is a schematic cross-sectional side view of the heating device according to a second embodiment of the present disclosure.

FIG. 8 is a schematic cross-sectional side view of the heating device 500 according to the second embodiment of the present disclosure.

The first heater 502 of the heating device 500 includes infrared irradiators 531. The infrared irradiators 531 includes a near infrared (NIR) heater 532. The NIR heater 532 irradiates an infrared ray having a peak wavelength in a near infrared region (about 0.78 μm to 1.5 μm).

Moisture contained in the sheet P has large absorption bands in the vicinity of 1.5 μm, 1.9 μm, and 2.5 μm, and a total absorption gradually increases toward lower wavelengths. Therefore, the NIR heater 532 having a peak wavelength in a wavelength region of less than 1.5 μm can obtain the same effect as the ultraviolet irradiator 521.

Further, the NIR heater 532 can be used to heat the sheet P from the conveyance belt 511 side (conveyance member side). Thus, the heating device 500 can reduce an output of the NIR heater 532 or reduce a number of NIR heaters 532.

A heating device 500 according to a third embodiment of the present disclosure is described with reference to FIG. 9.

Figure 9:
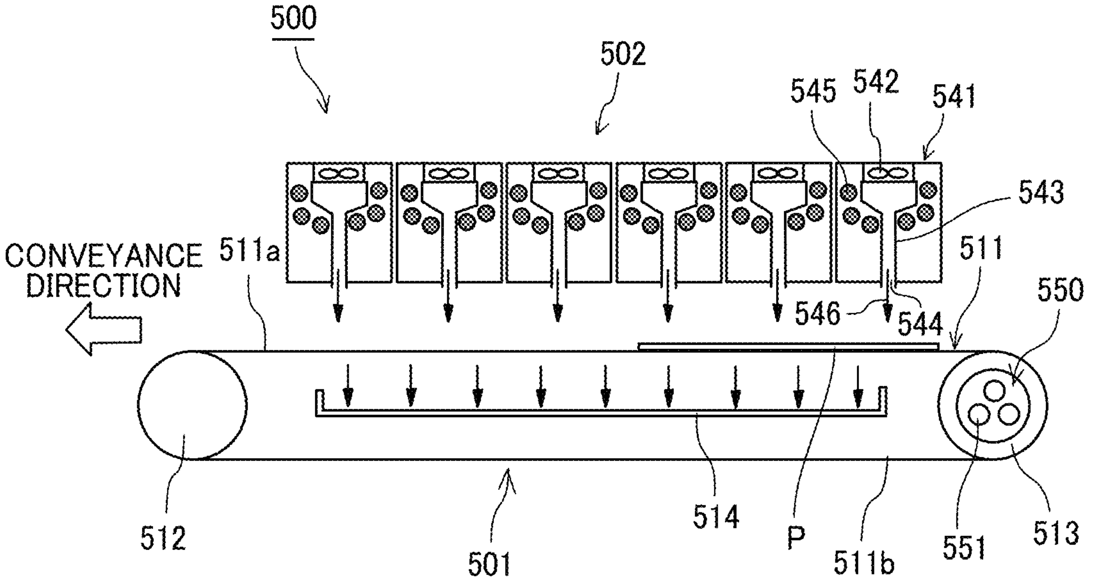
FIG. 9 is a schematic cross-sectional side view of the heating device according to a third embodiment of the present disclosure.

FIG. 9 is a schematic cross-sectional side view of the heating device 500 according to the third embodiment of the present disclosure.

The first heater 502 of the heating device 500 includes an air blower 541. The air blower 541 includes a fan 542, a channel member 543, nozzle 544, and an infrared heater 545. The fan 542 sucks air outside the heating device 500. The nozzle 544 is also referred to as a "blowout port."

The air blower 541 heats the air taken in by the fan 542 with the infrared heater 545 and blows a warm air 546 from the nozzle 544 toward the sheet P through the channel member 543. Thus, the air blower 541 can reduce a vapor density in the vicinity of the sheet P to promote evaporation while raising the temperature of the solvent and moisture in the ink applied to the sheet P.

The heating device 500 according to the third embodiment applies the warm air 546 to the blank portion Pb of the sheet P to evaporate the moisture in the blank portion Pb. Thus, the heating device 500 according to the third embodiment can prevent excessive evaporation of the moisture in the ink and reduce waviness (wrinkles) of the sheet P as compared with a heating device that uses the IR heater to directly applies the heat on an absorption wavelength of water.

Further, the heating device 500 using the air blower 541 can heat the sheet P from the conveyance member side by the heating element 551. Thus, the heating device 500 using the air blower 541 can heat and dry the sheet P with a setting temperature of the air blower 541 lower than a setting temperature of the air blower 541 in which the air blower 541 does not warm (heat) the sheet P from the conveyance member side.

A heating device 500 according to a fourth embodiment of the present disclosure is described with reference to FIG. 10.

Figure 10:
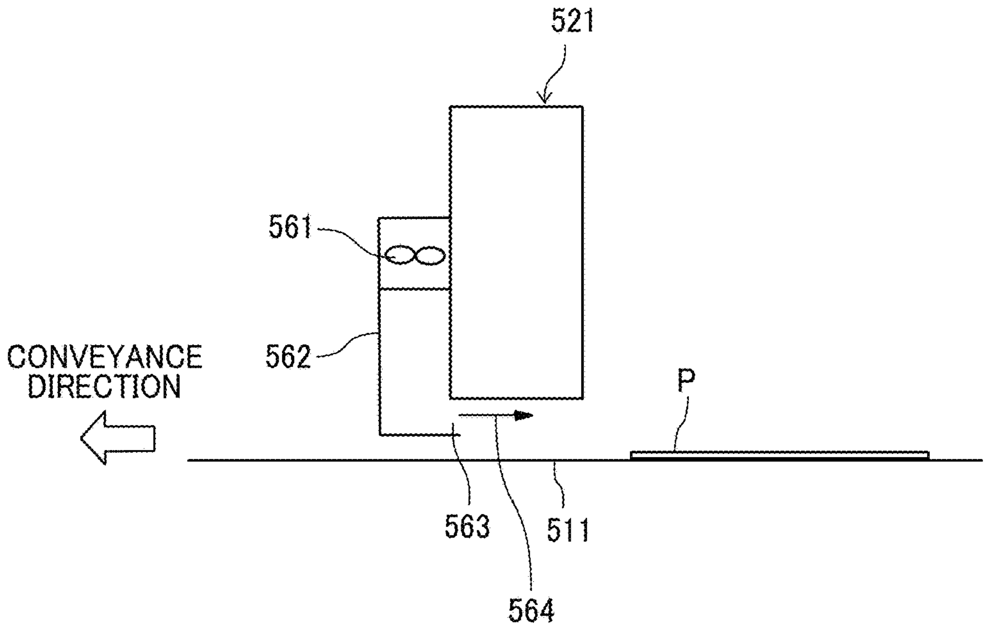
FIG. 10 is a schematic cross-sectional front view of the heating device according to a fourth embodiment of the present disclosure.

FIG. 10 is a schematic cross-sectional front view of the heating device 500 according to the fourth embodiment of the present disclosure.

The heating device 500 according to the fourth embodiment includes a fan 561, a channel 562, and a nozzle 563 on a side surface of the ultraviolet irradiator 521. The fan 561 sucks air from an exterior of the heating device 500. The channel 562 is used to blow air taken in by the fan 561 toward upstream in the conveyance direction (rightward direction in FIG. 10) from the nozzle 563 as an airflow 564.

While the sheet P is dried by the first heater 502, vapor generated by ink rises from the image portion Pa of the sheet P. If this vapor adheres to the irradiation surface 522 of the ultraviolet irradiator 521, the vapor may contaminate the irradiation surface 522 to reduce life of the ultraviolet irradiator 521.

The vapor generated from the ink rises toward the ultraviolet irradiator 521. Then, the vapor flows toward upstream in the conveyance direction (rightward direction in FIG. 10) by the airflow 564 blown from the nozzle 563. Thus, the vapor generated from the ink does not reach the irradiation surface 522 of each ultraviolet irradiators 521 or an interior of the ultraviolet irradiators 521.

Further, the airflow 564 containing the vapor is sucked by the suction chamber 514 through the conveyance belt 511 between the sheets P. Thus, the heating device 500 can discharge air containing vapor before the next sheet P is conveyed and reach to the heating device 500. Further, a removal of the vapor near a surface of the sheet P can effectively lower a vapor density near the ink and promote further generation of the vapor from an interior of the ink to improve the drying property.

Note that the first heater 502 of the heating device 500 according to the fourth embodiment is described with an example of the ultraviolet irradiator 521 according to the first embodiment applied as the first heater 502. However, the heating device 500 according to the fourth embodiment can also be applied to the second embodiment or the third embodiment as described above.

The heating device 500 according to a fifth embodiment of the present disclosure is described with reference to FIG. 11.

Figure 11:
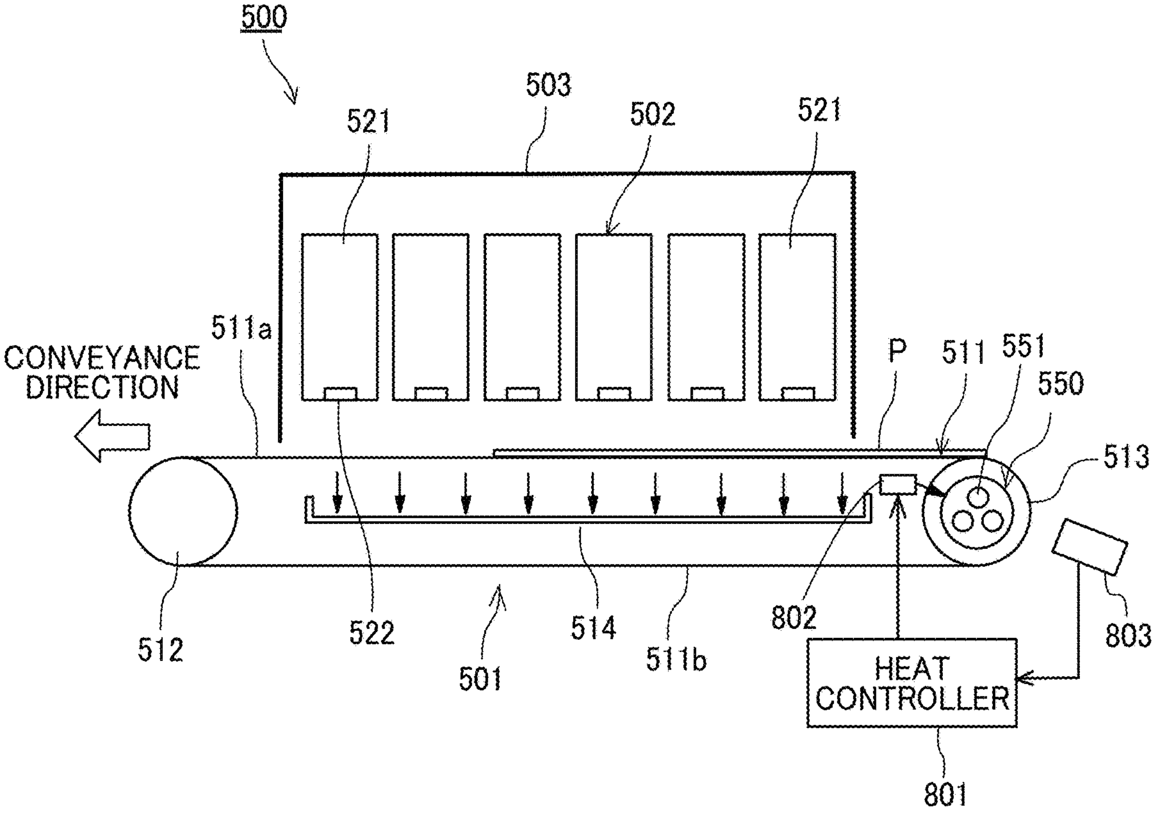
FIG. 11 is a schematic cross-sectional side view of the heating device according to a fifth embodiment of the present disclosure.

FIG. 11 is a schematic cross-sectional front view of the heating device 500 according to the fifth embodiment of the present disclosure.

The heating device 500 according to the fifth embodiment includes a heat controller 801 and a thermostat 802. The heat controller 801 includes a power supply system. The heating device 500 supply power to the heating element 551 of the second heater 550 from the heat controller 801 via the thermostat 802 to generate heat in the heating element 551.

Further, the heating device 500 includes a temperature detector 803 in a vicinity of the driven roller 513. Thus, a temperature detected by the temperature detector 803 is input to the heat controller 801.

A radiation thermometer is used as the temperature detector 803, for example. The temperature detector 803 detects the temperature of the conveyance belt 511 and uses the detected temperature for a heat control of the heating element 551. The temperature of the conveyance belt 511 is substantially identical and averaged in a system including the conveyance belt 511 and the driven roller 513.

The heat controller 801 controls the temperature detector 803 to acquire the temperature of the conveyance belt 511 for a plurality of times and calculate an average value of the temperatures to control the temperature of the conveyance belt 511. The heat controller 801 controls the temperature of the conveyance belt 511 to follow the target temperature of the conveyance belt 511 based on an on-off (ON-OFF) control or a proportional-integral-differential (PID) control of the heating element 551.

Further, the thermostat 802 senses ambient temperature of the driven roller 513 and automatically closes a circuit when the temperature reaches a predetermined temperature. Therefore, the thermostat 802 automatically closes the circuit to control an output of the heating element 551 to limit the output of the heating element 551 and temperature increase of the conveyance belt 511 when the output of the heating element 551 becomes equal to or larger than expected and the conveyance belt 511 becomes high temperature.

The heat controller 801 starts a heat control of the heating element 551 (heating control of the conveyance belt 511) when the printer 1 receives a print instruction.

When the heat controller 801 starts the heat control, the heat controller 801 controls an output to the heating element 551 by the ON-OFF control in an initial stage of the heat control to control the temperature of the conveyance belt 511 to reach the target temperature in a short time.

When the temperature detected by the temperature detector 803 is lower than a predetermined temperature margin and also lower than the target temperature, the heat controller 801 increases the output of the heating element 551 with a predetermined upper limit duty to control the temperature of the conveyance belt 511.

Conversely, when the detected temperature exceeds the predetermined temperature margin and also exceeds the target temperature, the heat controller 801 decreases the output of the heating element 551 with a predetermined lower limit duty to control the temperature of the conveyance belt 511. If the detected temperature is within the predetermined temperature margin, the heat controller 801 controls the heating element 551 with the same duty as a previous time.

Subsequently, when the temperature is stably fall within a predetermined temperature range, the heat controller 801 shifts the heat control to the PID control to reduce a fluctuation (rise and fall) of the temperature of the conveyance belt 511. The heat controller 801 controls the output to the heating element 551 using predetermined various parameters of the PID control according to a difference between the detected temperature and the target temperature.

Then, if the heating time exceeds a predetermined heating time and the detected temperature is within a target temperature range, the printer 1 allows to perform a printing process.

Thus, the heat controller 801 directly controls the output of the heating element 551 so that the heat controller 801 can increase the temperature of the conveyance belt 511 to reach the target temperature.

The heat controller 801 may use only one of the ON-OFF control and the PID control and may use a combination of both the ON-OFF control and the PID control.

Next, the target temperature of the conveyance belt and the target temperature of the sheet P is described with reference to FIG. 12.

Figures 12, 13:
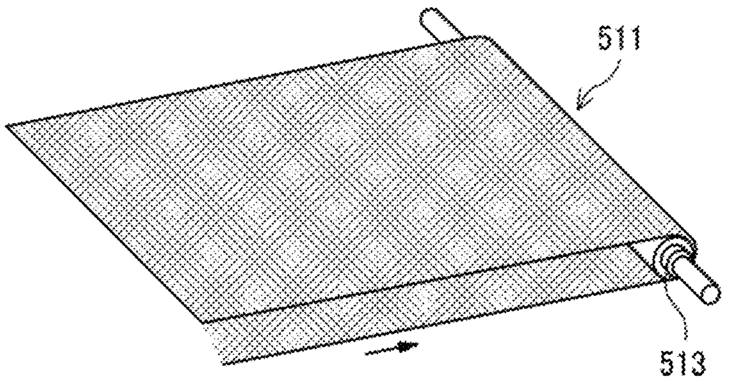
FIG. 12 is a table to illustrate a target temperature of a heat transfer device (conveyance belt) and a target temperature of the sheet.
FIG. 13 is a perspective view of the conveyance belt according to a first example.

FIG. 12 is a table to illustrate the target temperature of the conveyance belt 511 and the target temperature of the sheet P.

The heating device 500 according to the fifth embodiment changes the target temperature of the conveyance belt 511 under control according to print conditions since a heat transfer efficiency from the conveyance belt 511 to the sheet P changes according to the print conditions. The print conditions include, for example, a conveyance speed, a paper type, a thickness of a sheet P, and the like.

The heat controller 801 controls the target temperature of the conveyance belt 511 according to the print conditions in this way to controls the temperature of the sheet P to reach the target temperature (70° C. in the example in FIG. 12) even if the print conditions are different.

Thus, the heat controller 801 can improve the drying property to achieve the uniform drying property of the image portion Pa in the sheet P.

Thus, as in an example illustrated in FIG. 12, in condition A, a linear conveyance velocity of the conveyance belt 511 is high speed, a type of the sheet P (paper type) is paperboard, and a thickness (paper thickness) of the sheet P is thick.

When the linear conveyance velocity of the conveyance belt 511 is high, a rotation speed of the driven roller 513 increases. Thus, a contact time between the driven roller 513 and the conveyance belt 511, and a contact time between the conveyance belt 511 and the sheet P are shortened, and heat is less likely to be transferred from the conveyance belt 511 to the sheet P.

Thus, the heat controller 801 set a first target temperature of the conveyance belt 511 when the linear conveyance velocity of the conveyance belt 511 is a high speed in the condition A to be relatively higher than a second target temperature of the conveyance belt 511 when the linear conveyance velocity of the conveyance belt 511 is a low speed in the condition B. The linear conveyance velocity in the condition A (high speed) is larger than the linear conveyance velocity in the condition B (low speed).

When the type of the sheet P is paperboard as illustrated in the condition A, the thickness of the sheet P is also thick as in the condition A illustrated in FIG. 12. Thus, a time taken for heat transfer inside the sheet P increases in the condition A.

Thus, the heat controller 801 sets the target temperature of the conveyance belt 511 when the type of the sheet P is a paper board in the condition A to the first target temperature that is relatively higher than the second target temperature of the conveyance belt 511 when the type of the sheet P is coated paper, and the thickness of the sheet P is thinner than the paperboard in the condition B.

That is, the heat controller 801 previously sets the target temperature of the conveyance belt 511 in the heat control in the condition A to be higher (121° C. in this example) than the target temperature of the conveyance belt 511 in the condition B since the heating device 500 relatively difficult to heat the sheet P in the condition A.

On the other hand, the linear conveyance velocity of the conveyance belt 511 in the condition B is lower than the linear conveyance velocity in the condition A, the type of sheet P in the condition B is coated paper, and a paper thickness in the condition B is thinner than the paper thickness in the condition A.

When the linear conveyance velocity of the conveyance belt 511 is low, a rotation speed of the driven roller 513 decreases. Thus, a contact time between the driven roller 513 and the conveyance belt 511, and a contact time between the conveyance belt 511 and the sheet P are lengthened, and heat is likely to be transferred from the conveyance belt 511 to the sheet P.

Thus, the heat controller 801 set the second target temperature of the conveyance belt 511 when the linear conveyance velocity of the conveyance belt 511 is the low speed in the condition B to be relatively lower than the first target temperature of the conveyance belt 511 when the linear conveyance velocity of the conveyance belt 511 is the high speed in the condition A.

When the type of the sheet P is a coated paper and a thickness of the sheet P is thin, a time taken for transferring the heat inside the sheet P shortens. Thus, the heat controller 801 sets the target temperature of the conveyance belt 511 in the condition B to the second target temperature that is relatively lower than the first target temperature in the condition A in which the type of the sheet P is a paper board.

That is, the heat controller 801 previously sets the second target temperature of the conveyance belt 511 in the heat control in the condition B to be lower (76° C. in this example) than the first target temperature of the conveyance belt 511 in the condition A since the heating device 500 relatively easier to heat the sheet P in the condition B.

The heat controller 801 performs such a setting to enable to keep the temperature of the sheet P at approximately 70° C. even if the print conditions are different.

The target temperature of the sheet P refers to a temperature of a surface of the sheet P to which the liquid is applied. The second target temperature is intended to maintain the temperature of the sheet P in a drying process by the ultraviolet irradiator 521 at approximately 70° C. in the condition B. However, the second target temperature is not limited to 70° C.

Next, different examples (first to third examples) of the conveyance belt 511 is described with reference to FIGS. 13 to 15.

Figure 14:
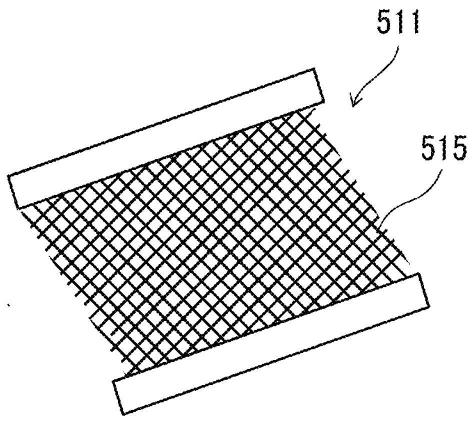
FIG. 14 is a perspective view of the conveyance belt according to a second example.
Figure 15:
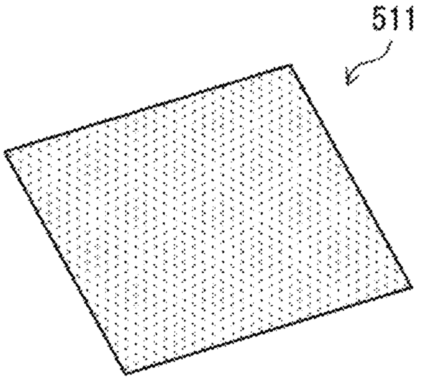
FIG. 15 is a perspective view of the conveyance belt according to a third example.

FIGS. 13 to 15 are perspective views of the conveyance belt 511 according to a first example to a third example.

The conveyance belt 511 has an air-permeable structure in which a plurality of through holes (suction holes) are dispersed and opened on a surface of the conveyance belt 511. Further, the heating device 500 includes the suction chamber 514 inside the conveyance belt 511. The heating device 500 sucks the sheet P by the suction chamber 514 to attract the sheet P to the conveyance belt 511.

The conveyance belt 511 of the first example illustrated in FIG. 13 includes suction holes dispersedly opened in a flat belt. The conveyance belt 511 of the second example illustrated in FIG. 14 is a mesh belt in which linear members 515 such as glass fibers are arranged in a mesh shape.

The conveyance belt 511 of the third example illustrated in FIG. 15 includes a plurality of suction holes and a plain weave belt made of glass fiber. The plain weave belt supports the sheet P.

The conveyance belt 511 may also be made of, for example, a porous member. Further, the suction hole (opening) is not limited to a circular shape and may be a honeycomb shape or the like.

Next, thermal characteristics of the conveyance belt 511 as the conveyance member is described with reference to FIGS. 16 and 17.

Figure 16:
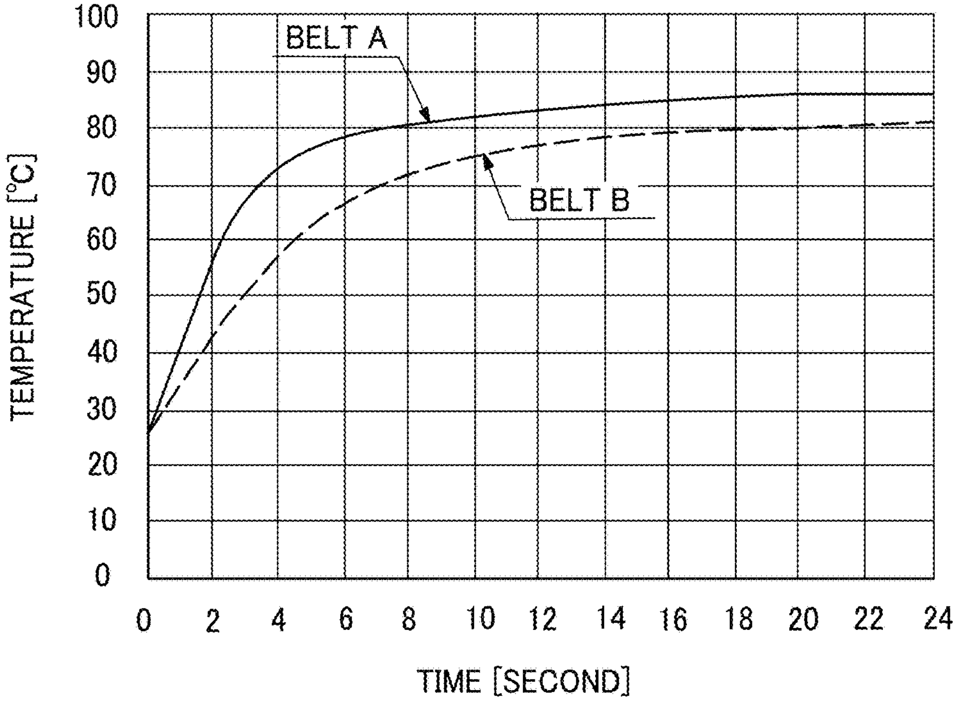
FIG. 16 is a graph illustrating thermal characteristics of the conveyance belt.
Figure 17:
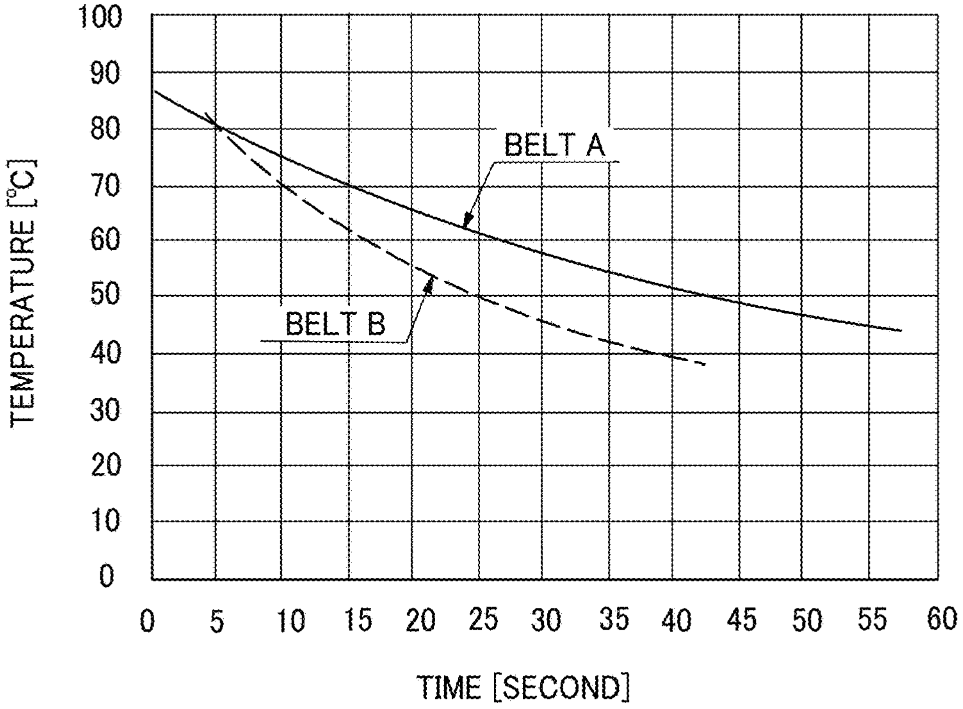
FIG. 17 is a graph illustrating thermal characteristics of the conveyance belt.

FIGS. 16 and 17 are graphs illustrating the thermal characteristics of the conveyance belt 511.

FIG. 16 is a graph that illustrates a result of measuring the temperature of the conveyance belt 511 at a time of heat transfer to each conveyance belt 511. A plain weave belt is indicated as "belt A," and a mesh belt is indicated as "belt B." From the result illustrated in FIG. 16, it can be seen that a temperature increase of the belt A is higher than a temperature increase of the belt B due to heat transfer.

FIG. 17 is a graph that illustrates a result of measuring the temperature of the conveyance belt 511 at the time of a heat dissipation to each conveyance belt 511. The plain weave belt is indicated as "belt A," and the mesh belt is indicated as "belt B." From the result illustrated in FIG. 17, it can be seen that the belt A is less likely to dissipate heat than the belt B.

From the result illustrated in FIG. 17, it can be seen that the plain weave belt (belt A) has a property that is easy to transfer heat and difficult to dissipate heat. The fact that the plain weave belt is easy to transfer heat means that the temperature of the conveyance belt 511 reaches the target temperature of the conveyance belt 511 in a short time. Thus, the conveyance belt 511 using the plain weave belt leads to faster temperature control and lower power consumption.

Conversely, the fact that the lain weave belt is difficult to dissipate heat means that the heat retention is good and extra temperature control becomes unnecessary. Thus, the conveyance belt 511 using the plain weave belt leads to faster temperature control and lower power consumption. Therefore, the plain weave belt is preferable as the conveyance member.

On the other hand, the mesh belt includes linear members woven in a mesh shape. A portion of the mesh belt through which the heat is transferred from the driven roller 513 by contacting with the driven roller 513 is made of a line. Further, an overall surface area of the mesh belt is larger than the overall surface area of the plain weave belt. Therefore, the mesh belt is a belt that is difficult to be heated because a contact area is smaller than a contact area of the plain weave belt and easily dissipates heat because the mesh belt has a large surface area.

Although the plain weave belt has a mesh-like weave, the plain weave belt has no mesh as compared with the mesh belt but includes suction holes opened at required intervals. Thus, the plain weave belt contact with the driven roller 513 with surface contact (plane contact) and dissipates heat from a surface of the plain weave belt. Thus, the plain weave belt is easier to be heated and less likely to dissipate heat than the mesh belt.

The heating device 500 according to a sixth embodiment of the present disclosure is described with reference to FIGS. 18 and 19.

Figure 18:
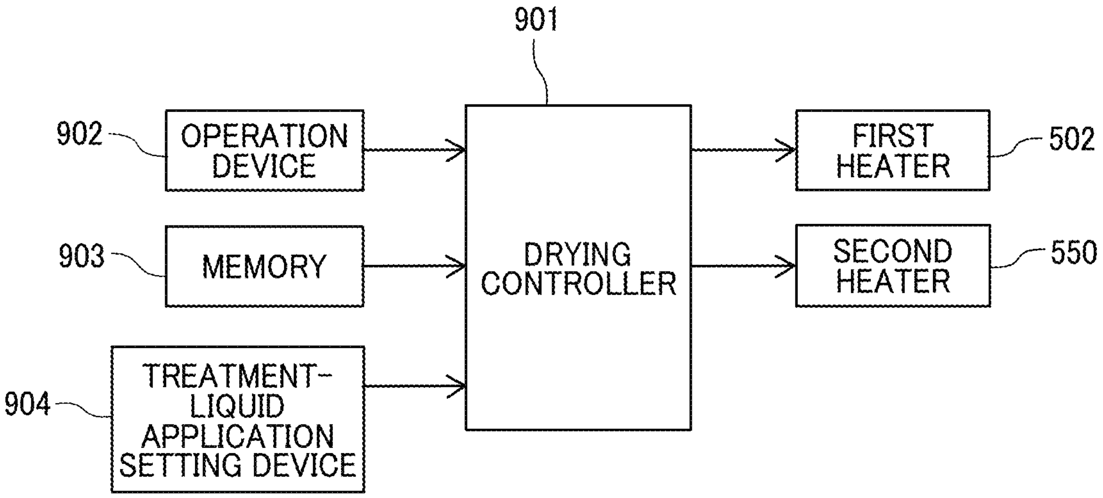
FIG. 18 is a block diagram of a portion related to a heat control of the heating device according to a sixth embodiment of the present disclosure.

FIG. 18 is a block diagram of a portion related to the heat control of the heating device 500 according to the sixth embodiment of the present disclosure.

FIG. 19 is a table illustrating an example of the heat control of the heating device 500 according to the sixth embodiment of the present disclosure.

The heating device 500 includes a drying controller 901 to perform a heat control of the first heater 502 and a heat control of the second heater 550.

The heating device 500 includes an operation device 902 to input a print mode, a presence of an application of treatment liquid, and a condition of the sheet P to be used.

The heating device 500 includes a treatment-liquid application setting device 904 to set application of a treatment liquid (presence of application of the treatment liquid) by a pretreatment unit 20.

The heating device 500 according to the sixth embodiment provides information related to a presence of application of the treatment liquid set by the treatment-liquid application setting device 904 to the drying controller 901 as information related to the sheet P.

The heating device 500 includes a memory 903 that stores the table as illustrated in FIG. 19. The memory 903 stores the table in which information related to a presence of application of the treatment liquid onto the sheet P, the paper type of the sheet P, the basic weight or thickness of the sheet P, an output (duty) of the first heater 502, and the target temperature of the conveyance belt 511 are tabulated. The conveyance belt 511 is referred to as a "heat transfer device" in FIG. 19.

The memory 903 also stores the table in which a paper type of the sheet P (coated paper, plain paper, and paper board, for example) and a basic weight (or thickness) of the sheet P associated with the paper type of the sheet P.

Figure 20:
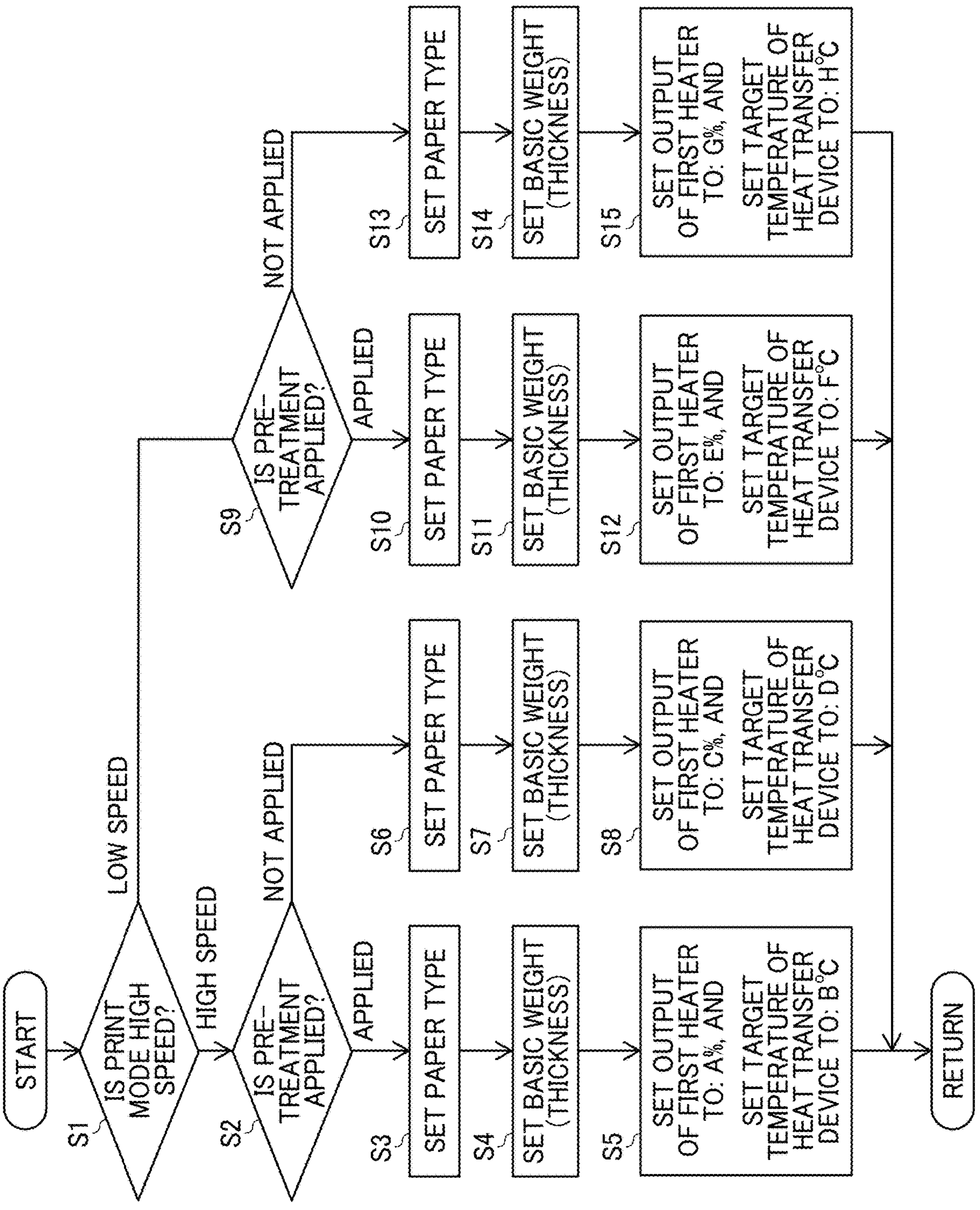
FIG. 20 is a flowchart illustrating an example of control by a dry controller according to the sixth embodiment of the present disclosure.

Next, an example of the heat control by the drying controller 901 is described with reference to a flowchart in FIG. 20.

The drying controller 901 determines whether the print mode is high speed (step S1). Hereinafter, the step S1 is simply referred to as "S1." That is, the drying controller 901 changes the conveyance speed according to a change of the print mode between the high speed and the low speed.

The change of the print mode affects a heat transfer effect between the driven roller 513 and the conveyance belt 511, and between the conveyance belt 511 and the sheet P.

Specifically, the conveyance speed is high and contact time of the members is short in the print mode of high speed. Thus, the drying controller 901 increase the target temperature of the conveyance belt 511.

Thus, the print mode relates to the linear conveyance velocity described in FIG. 12 such that the print mode of high speed in FIG. 19 corresponds to the linear conveyance velocity of high speed in FIG. 12, and the print mode of low speed in FIG. 19 corresponds to the linear conveyance velocity of low speed in FIG. 12.

When the print mode is high speed, the drying controller 901 determines a presence of pre-treatment, that is, whether the treatment liquid (pre-treatment) is applied (S2).

The amount of ink adhered onto the sheet P may be different between a print mode that applies the treatment liquid onto the sheet P and a print mode that does not apply the treatment liquid onto the sheet P. Specifically, when the treatment liquid is applied on the sheet P, the treatment liquid reduces a spread of droplets (dots) and prevents bleeding of the ink on the sheet P.

However, the printer 1 has to increase an amount of ink adhering onto the sheet P in the print mode having the pre-treatment to be larger than an amount of ink adhering onto the sheet P in the print mode having no pre-treatment to obtain a target image density.

Thus, the drying controller 901 has to increase the output of the first heater 502 necessary to dry the ink and the treatment liquid on the sheet P.

Then, when the treatment liquid (pre-treatment) is applied on the sheet P, the drying controller 901 determines a setting of the paper type of the sheet P (S3).

That is, the drying controller 901 has to change the output of the heater (first heater 502 and the second heater 550) since a drying efficiency of the ink in the image portion Pa changes according to the paper type of the sheet P.

Further, the heating device 500 has to change the target temperature of the conveyance belt 511 according to the paper type since the heat transfer efficiency inside the sheet P changes according to the paper type of the sheet P.

Next, the drying controller 901 determines the setting of the basis weight (thickness) of the sheet P (S4). That is, the drying controller 901 has to change the output of the first heater 502 since a drying efficiency of the ink in the image portion Pa changes according to the basic weight (thickness) of the sheet P.

Further, the drying controller 901 has to change the target temperature of the conveyance belt 511 according to the basic weight (thickness) of the sheet P since the heat transfer efficiency inside the sheet P changes according to the basic weight (thickness) of the sheet P.

Then, the drying controller 901 sets the output (duty) of the first heater 502 to A % and sets the target temperature of the conveyance belt 511 to B ° C. with reference to the table based on the determination results in the steps S1 to S4 to perform the heat control (S5). The conveyance belt 511 is referred to as the "heat transfer device" in FIG. 20.

On the other hand, the drying controller 901 determines the setting of the paper type of the sheet P when the treatment liquid (pre-treatment) is not applied on the sheet P in the determination result in the step S2 (S6).

Next, the drying controller 901 determines the setting of the basic weight (thickness) of the sheet P (S7).

Then, the drying controller 901 sets the output (duty) of the first heater 502 to C % and sets the target temperature of the conveyance belt 511 to D° C. with reference to the table based on the determination results in the steps S1, S2, S6, and S7 to perform the heat control (S8).

The drying controller 901 determines the presence of application of the treatment liquid (application of pre-treatment) when the print mode is low speed in the determination result in the step S1 (S9).

When the treatment liquid (pre-treatment) is applied on the sheet P, the drying controller 901 determines the setting of the paper type of the sheet P (S10). Next, the drying controller 901 determines the setting of the basic weight (thickness) of the sheet P (S11).

Then, the drying controller 901 sets the output (duty) of the first heater 502 to E % and sets the target temperature of the conveyance belt 511 to F° C. with reference to the table based on the determination results in the steps S1, S9 to S11 to perform the heat control (S12).

On the other hand, the drying controller 901 determines the setting of the paper type of the sheet P when the treatment liquid (pre-treatment) is not applied on the sheet P in the determination result in the step S9 (S13).

Next, the drying controller 901 determines the setting of the basic weight (thickness) of the sheet P (S14).

Then, the drying controller 901 sets the output (duty) of the first heater 502 to G % and sets the target temperature of the conveyance belt 511 to H° C. with reference to the table based on the determination results in the steps S1, S9, S6, S13, and S14 to perform the heat control (S15).

Here, the outputs (duty) of A %, C %, E %, and G % of the first heater 502 and the target temperatures B° C., D° C., F° C., and H° C. of the conveyance belt 511 (heat transfer device) become the outputs and the target temperatures according to the table illustrated in FIG. 19 as described above.

The table in FIG. 19 is one of an example, and the table is not limited to FIG. 19.

Thus, the heat controller 801 according to the sixth embodiment controls the temperature of the conveyance belt 511 to the target temperature to set the output (duty) of the first heater 502 and the target temperature of the conveyance belt 511 so that the temperature of the sheet P becomes substantially 70° C. regardless of printing conditions as described in the above embodiments.

Thus, the drying controller 901 can output printed matter having a certain level of quality (drying property and wrinkles).

The heating device 500 according to a seventh embodiment of the present disclosure is described with reference to FIG. 21.

Figure 21:
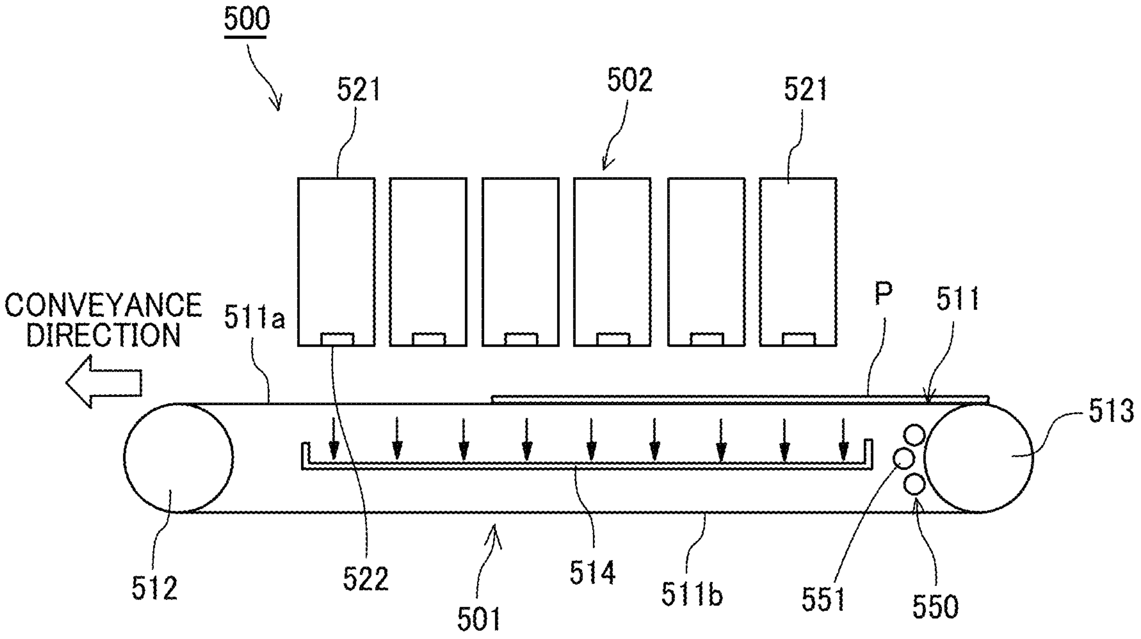
FIG. 21 is a schematic cross-sectional side view of a heating device according to a seventh embodiment of the present disclosure.

FIG. 21 is a schematic cross-sectional side view of the heating device 500 according to the sixth embodiment of the present disclosure.

The heating device 500 according to the seventh embodiment includes the heating elements 551 outside the driven roller 513 and in the vicinity of the driven roller 513.

Three heating elements 551 are disposed around the driven roller 513 in FIG. 21 to heat the driven roller 513. For example, the heating elements 551 of the second heater 550 is outside of and adjacent to the driven roller 513.

For example, the heating element 551 may not able to install the heating element 551 inside the driven roller 513 due to wiring or layout reasons.

However, the heating device 500 according to the seventh embodiment can be applied in such a case to enable to heat the driven roller 513 and the conveyance belt 511 contacting with the driven roller 513. The conveyance belt 511 is an example of conveyance member.

The heating device 500 according to an eighth embodiment of the present disclosure is described with reference to FIG. 22.

Figure 22:
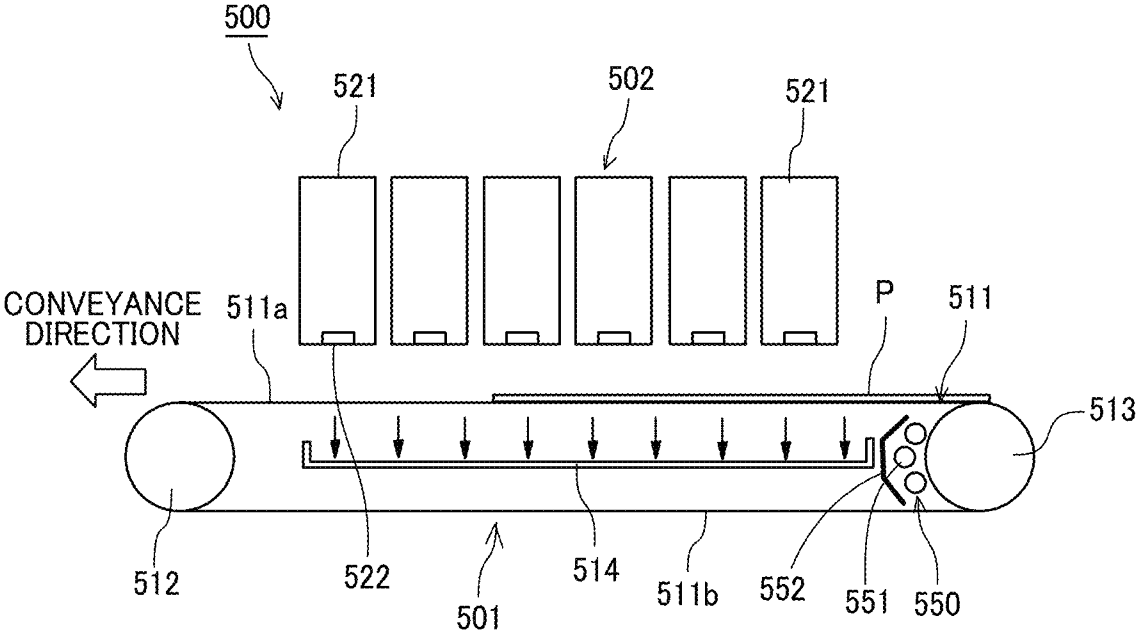
FIG. 22 is a schematic cross-sectional side view of a heating device according to an eighth embodiment of the present disclosure.

FIG. 22 is a schematic cross-sectional side view of the heating device 500 according to the eighth embodiment of the present disclosure.

The heating device 500 according to the eighth embodiment further includes a reflector 552 as a reflector at a position facing the driven roller 513 with the heating element 551 disposed between the reflector 552 and the driven roller 513 in addition to heating device according to the seventh embodiment (see FIG. 21).

Thus, the heating device 500 can efficiently heat the driven roller 513 with the radiant heat generated from the heating element 551 without leakage by reflecting the radiant heat to the driven roller 513 by the reflector 552.

Further, the reflector 552 arranged to face the driven roller 513 can shield radiant heat generated from the heating element 551 to the suction chamber 514 and the conveyance belt 511 to lengthen a life of the parts of the suction chamber 514 and the conveyance belt 511.

A metal plate is used as the reflector 552. A material of the reflector 552 may be, for example, aluminum, but is not limited to aluminum. Further, a steel on which an aluminum vapor deposition is applied may be used as the reflector 552. Further, an aluminum surface may be anodized to increase the reflectance of the reflector 552. Further, a surface of the reflector 552 may be mirror-finished.

The heating device 500 according to a ninth embodiment of the present disclosure is described with reference to FIG. 23.

Figure 23:
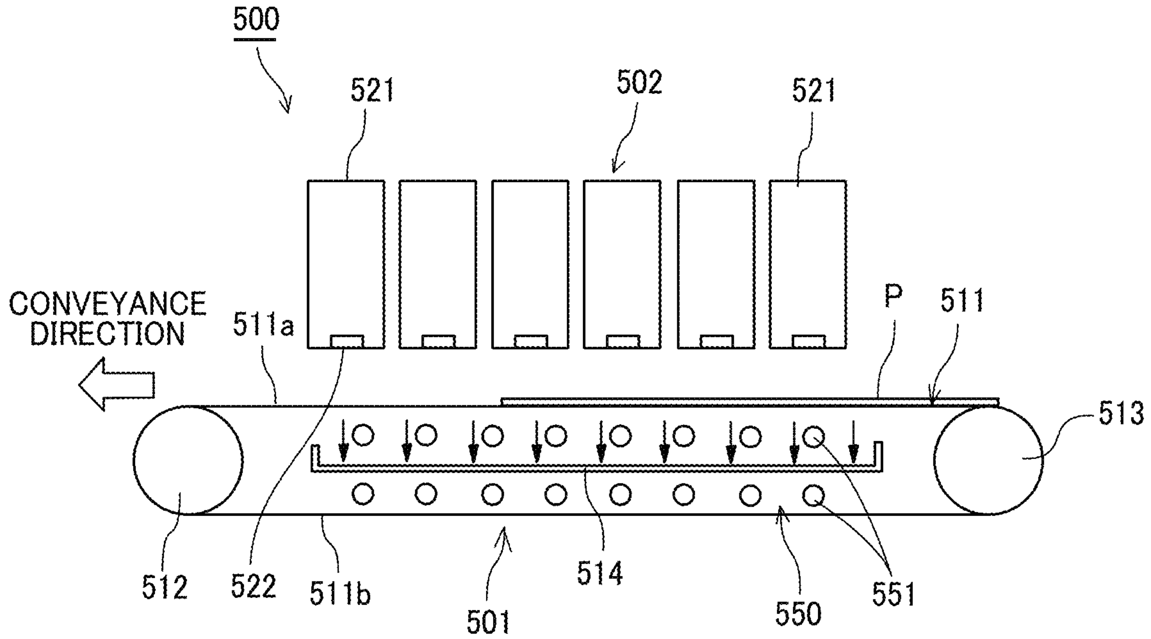
FIG. 23 is a schematic cross-sectional side view of a heating device according to a ninth embodiment of the present disclosure.

FIG. 23 is a schematic cross-sectional side view of the heating device 500 according to the ninth embodiment of the present disclosure.

The heating device 500 according to ninth embodiment includes a plurality of heating elements 551 to from the second heater 550 inside a loop of the endless conveyance belt 511 to directly heat the conveyance belt 511 from an interior of the conveyance belt 511. The conveyance belt 511 is an example of a conveyance member.

Each of the plurality of heating elements 551 faces an inner surface of the conveyance belt 511 and the suction chamber 514. Further, the plurality of heating elements 551 is arranged along the conveyance direction of the conveyance belt 511.

Here, a portion of the conveyance belt 511 that moves in the conveyance direction indicated by arrow in FIG. 23 is referred as a "forward portion 511*a*", and a portion of the conveyance belt 511 that moves in a direction opposite to the conveyance direction is referred to as a "backward portion 511*b*."

The plurality of the heating elements 551 of the heating device 500 according to the ninth embodiment heats both of the forward portion 511*a* and the backward portion 511*b* of the conveyance belt 511. However, the plurality of the heating elements 551 may heat either one of the forward portion 511*a* or the backward portion 511*b* of the conveyance belt 511.

For example, the heating element 551 may not be able to be installed inside or outside the driven roller 513 due to wiring or layout reasons. However, the heating device 500 according to the ninth embodiment can be applied in such a case to enable to heat the conveyance belt 511 (conveyance member).

The heating device 500 according to a tenth embodiment of the present disclosure is described with reference to FIG. 24.

Figure 24:
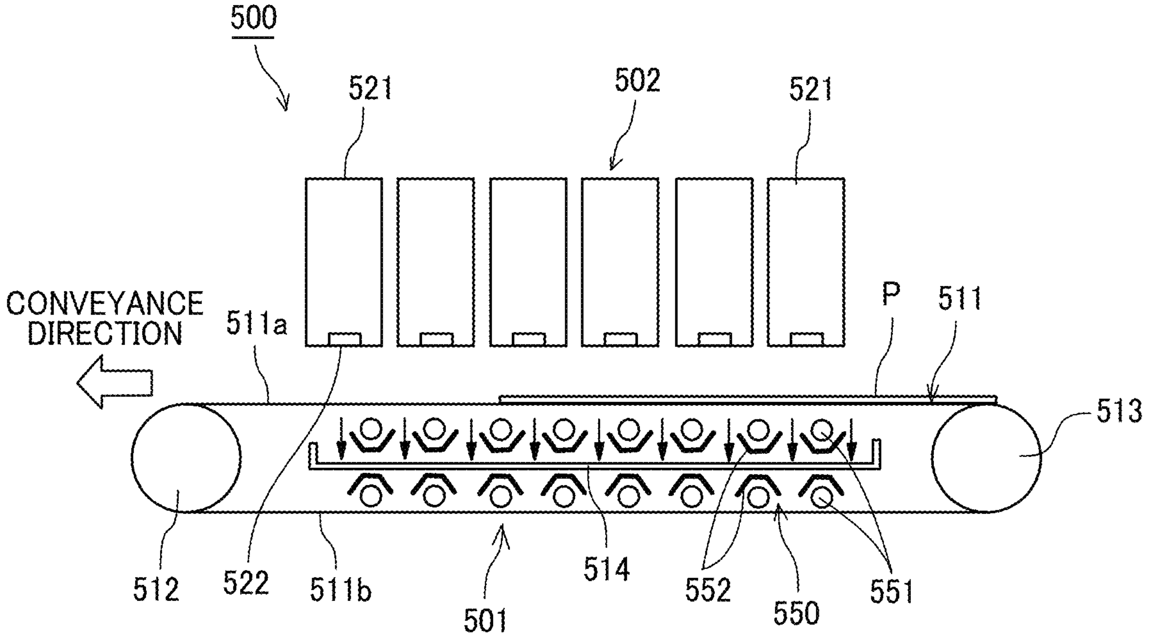
FIG. 24 is a schematic cross-sectional side view of the heating device according to a tenth embodiment of the present disclosure.

FIG. 24 is a schematic cross-sectional side view of the heating device 500 according to the tenth embodiment of the present disclosure.

The heating device 500 according to the tenth embodiment further includes reflectors 552 as a reflector at a position facing a back surface (inner surface) of the conveyance belt 511 with the heating element 551 disposed between the reflector 552 and the conveyance belt 511 in addition to the heating device 500 according to the ninth embodiment (see FIG. 21).

Thus, the heating device 500 can efficiently heat the conveyance belt 511 with the radiant heat generated from the heating element 551 without leakage by reflecting the radiant heat to the conveyance belt 511 by the reflector 552. Further, the reflector 552 arranged to face the conveyance belt 511 can shield radiant heat generated from the heating element 551 to the suction chamber 514 to lengthen a life of the parts of the suction chamber 514.

The heating device 500 according to an eleventh embodiment of the present disclosure is described with reference to FIG. 25.

Figure 25:
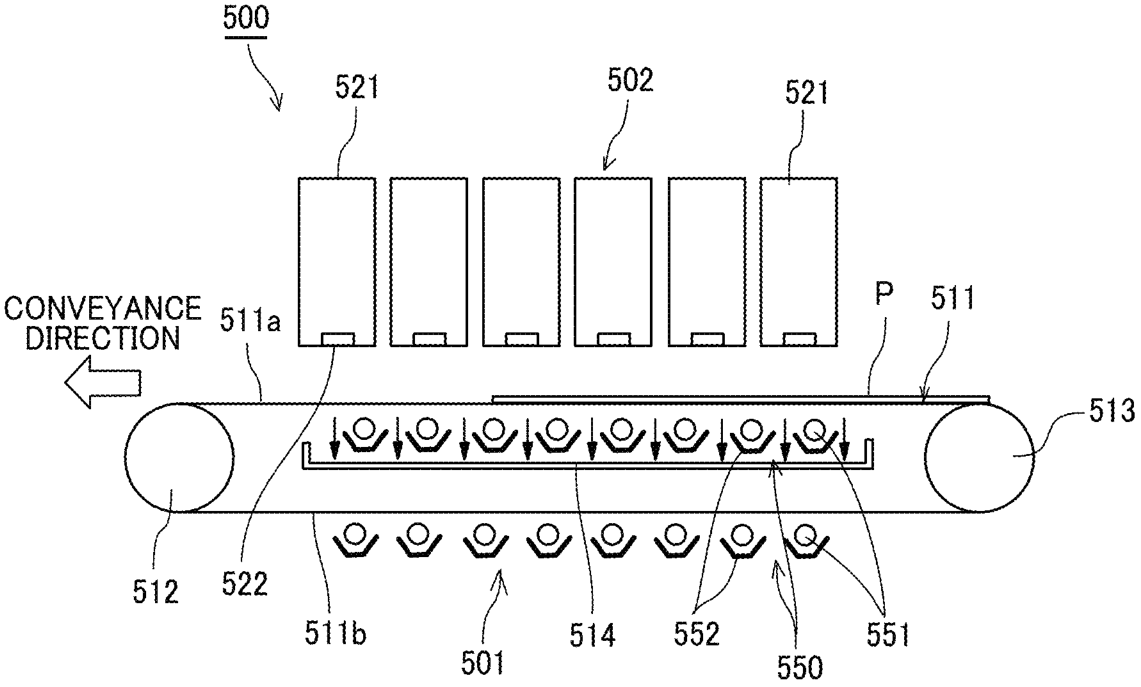
FIG. 25 is a schematic cross-sectional side view of the heating device according to an eleventh embodiment of the present disclosure.

FIG. 25 is a schematic cross-sectional side view of the heating device 500 according to the eleventh embodiment of the present disclosure.

The heating device 500 according to the eleventh embodiment includes a plurality of heating elements 551 to from the second heater 550 outside the backward portion 511*b* of the conveyance belt 511 to directly heat the conveyance belt 511 from an exterior of the conveyance belt 511.

The heating device 500 according to the eleventh embodiment includes reflectors 552 as a reflector at a position facing the exterior of the backward portion 511*b* of the conveyance belt 511. The reflectors 552 are disposed between the suction chamber 514 and the plurality of heating elements 551.

Thus, the heating device 500 can efficiently heat the conveyance belt 511 with the radiant heat generated from the heating element 551 without leakage by reflecting the radiant heat to the conveyance belt 511 by the reflector 552. Further, the reflector 552 arranged to face the conveyance belt 511 can shield radiant heat generated from the heating element 551 to the suction chamber 514 to lengthen a life of the parts of the suction chamber 514.

Further, the heating element 551 arranged outside the conveyance belt 511 can reduce a size of the conveyance belt 511 in a height (vertical) direction and shorten a peripheral length of the conveyance belt 511.

The heating element 551 and the reflector 552 that heat the conveyance belt 511 from an interior of the forward portion 511*a* of the conveyance belt 511 may be omitted. Further, the reflector 552 on the exterior of the backward portion 511*b* of the conveyance belt 511 may be omitted.

The heating device 500 according to a twelfth embodiment of the present disclosure is described with reference to FIG. 26.

Figure 26:
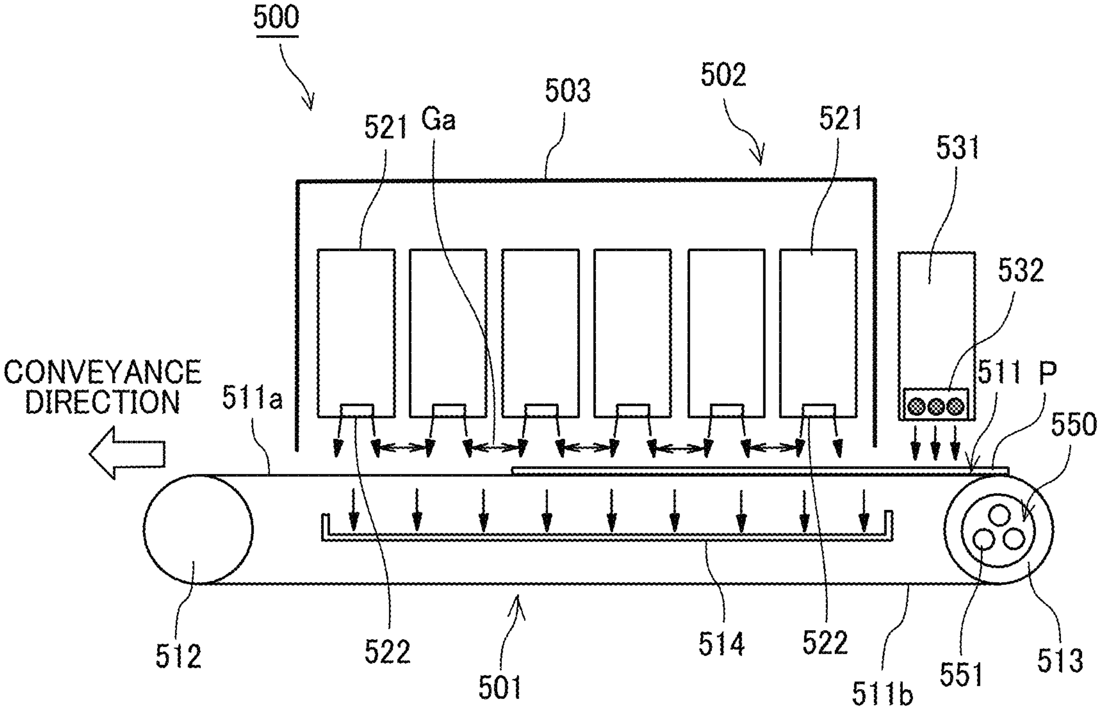
FIG. 26 is a schematic cross-sectional side view of the heating device according to a twelfth embodiment of the present disclosure.

FIG. 26 is a schematic cross-sectional side view of the heating device 500 according to the twelfth embodiment of the present disclosure.

The first heater 502 of the heating device 500 according to the twelfth embodiment includes the infrared irradiator 531 and ultraviolet irradiators 521. The infrared irradiator 531 is arranged upstream of the ultraviolet irradiator 521 in the conveyance direction of the sheet P as indicated by arrow in FIG. 27.

The infrared irradiator 531 includes a near infrared (NIR) heater 532. The NIR heater 532 emits an infrared ray having a peak wavelength in a near infrared region (about 0.78 m to 1.5 μm). The ultraviolet irradiators 521 irradiate the sheet P conveyed by the conveyance mechanism 501 with ultraviolet rays to heat the sheet P.

The NIR heater 532 is less likely to cause wrinkles on the sheet P. The NIR heater 532 is arranged upstream of the ultraviolet irradiators 521 in the conveyance direction of the sheet P. Thus, the NIR heater 532 can increase the temperature of the sheet P before the sheet P enters and faces the ultraviolet irradiators 521. Thus, the heating device 500 can accelerate drying of the ink on the sheet P with the ultraviolet irradiators 521 arranged downstream of the infrared irradiator 531 in the conveyance direction of the sheet P.

Figure 27:
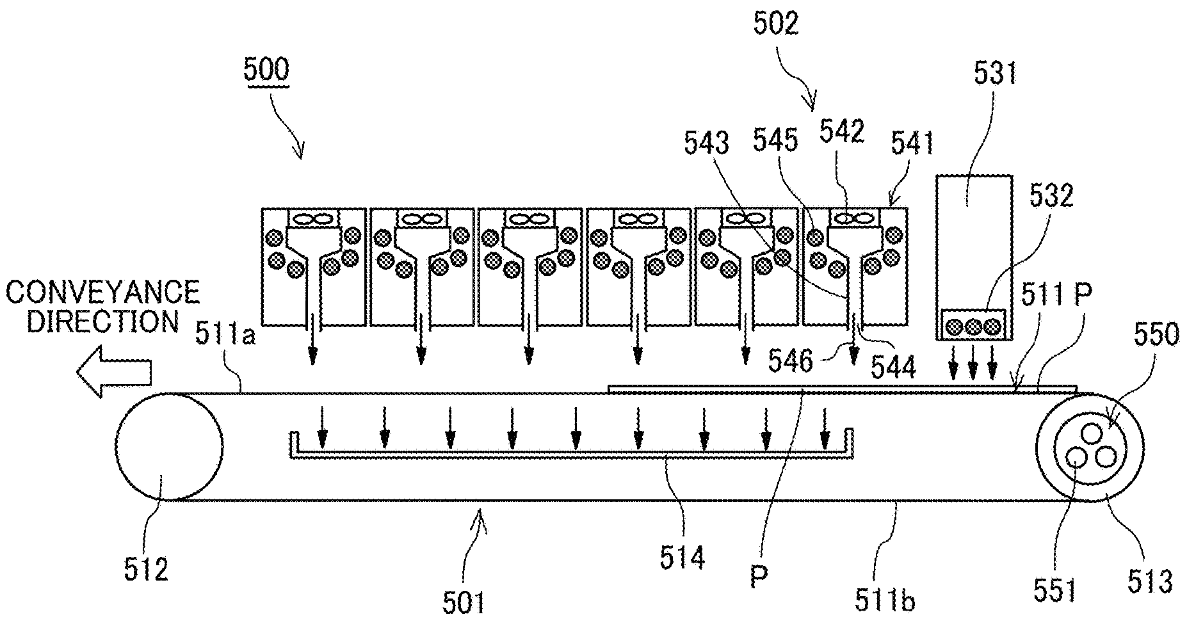
FIG. 27 is a schematic cross-sectional side view of the heating device according to a thirteenth embodiment of the present disclosure.

The heating device 500 according to a thirteenth embodiment of the present disclosure is described with reference to FIG. 27. FIG. 27 is a schematic cross-sectional side view of the heating device 500 according to the thirteenth embodiment of the present disclosure.

The first heater 502 of the heating device 500 according to the thirteenth embodiment includes the infrared irradiator 531 and the air blowers 541. The infrared irradiator 531 is arranged upstream of the air blower 541 in the conveyance direction of the sheet P as indicated by arrow in FIG. 27.

The infrared irradiator 531 includes the near infrared (NIR) heater 532. The NIR heater 532 emits the infrared ray having the peak wavelength in the near infrared region (about 0.78 μm to 1.5 μm). The air blower 541 includes the fan 542, the channel member 543, the nozzle 544, and the infrared heater 545. The fan 542 sucks air outside the heating device 500. The nozzle 544 is also referred to as a "blowout port."

Both the infrared irradiator 531 and the air blowers 541 are less likely to cause wrinkles on the sheet P.

Thus, the NIR heater 532 can increase the temperature of the sheet P before the sheet P enters and faces the air blowers 541 to accelerate drying of the ink on the sheet P. Further, the heating device 500 according to the thirteenth embodiment can obtain more effect for white ink that does has no UV absorption wavelength.

The heating device 500 according to a fourteenth embodiment of the present disclosure is described with reference to FIG. 28.

Figure 28:
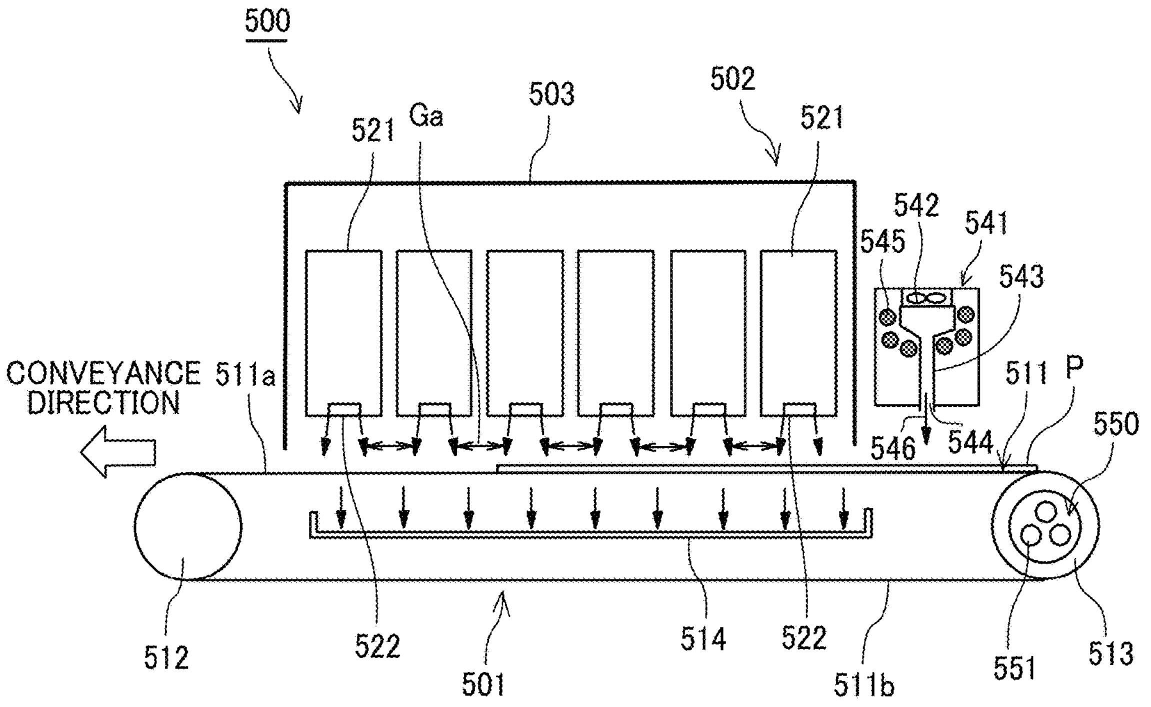
FIG. 28 is a schematic cross-sectional side view of the heating device according to a fourteenth embodiment of the present disclosure.

FIG. 28 is a schematic cross-sectional side view of the heating device 500 according to the fourteenth embodiment of the present disclosure.

The first heater 502 of the heating device 500 according to the fourteenth embodiment includes the air blower 541 and the ultraviolet irradiators 521. The air blower 541 is arranged upstream of the ultraviolet irradiators 521 in the conveyance direction of the sheet P as indicated by arrow in FIG. 28.

The air blower 541 includes the fan 542, the channel member 543, the nozzle 544, and the infrared heater 545. The fan 542 sucks air outside the heating device 500. The nozzle 544 is also referred to as a "blowout port." The ultraviolet irradiators 521 irradiate the sheet P conveyed by the conveyance mechanism 501 with ultraviolet rays to heat the sheet P.

The air blower 541 is less likely to cause wrinkles in the sheet P. The air blower 541 arranged upstream of the ultraviolet irradiators 521 in the conveyance direction of the sheet P can increase the temperature of the sheet P before the sheet enters and faces the ultraviolet irradiators 521. Thus, the heating device 500 can accelerate drying of the ink on the sheet P with the ultraviolet irradiators 521 arranged downstream of the infrared irradiator 531 in the conveyance direction of the sheet P.

The heating device 500 according to a fifteenth embodiment of the present disclosure is described with reference to FIG. 29.

Figure 29:
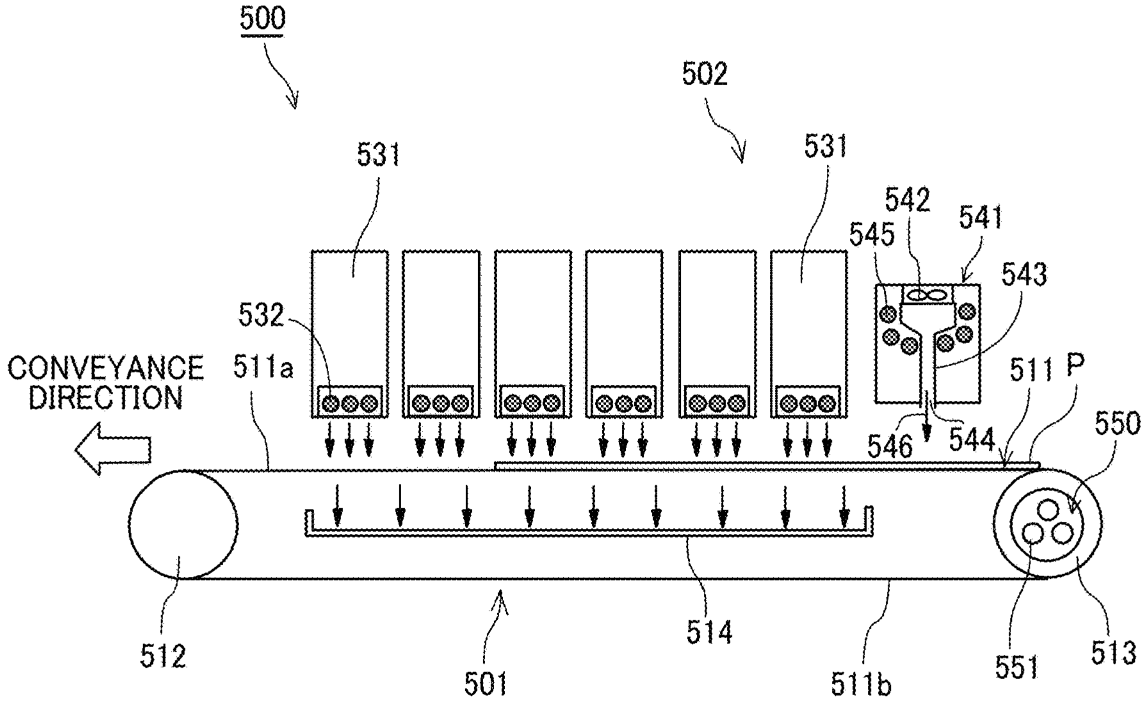
FIG. 29 is a schematic cross-sectional side view of the heating device according to a fifteenth embodiment of the present disclosure.

FIG. 29 is a schematic cross-sectional side view of the heating device 500 according to the fifteenth embodiment of the present disclosure.

The first heater 502 of the heating device 500 according to the fifteenth embodiment includes the air blower 541 and the infrared irradiators 531. The air blower 541 is arranged upstream of the infrared irradiator 531 in the conveyance direction of the sheet P as indicated by arrow in FIG. 29.

The air blower 541 includes the fan 542, the channel member 543, the nozzle 544, and the infrared heater 545. The fan 542 sucks air outside the heating device 500. The nozzle 544 is also referred to as a "blowout port." Each of the infrared irradiator 531 includes the near infrared (NIR) heater 532. The NIR heater 532 emits the infrared ray having the peak wavelength in the near infrared region (about 0.78 μm to 1.5 μm).

Both the infrared irradiators 531 and the air blower 541 are less likely to cause wrinkles on the sheet P.

Thus, the air blower 541 can increase the temperature of the sheet P before the sheet P enters and faces the NIR heaters 532 of the infrared irradiators 531 to accelerate drying of the ink on the sheet P. Further, the heating device 500 according to the fifteenth embodiment can obtain more effect for white ink that does has no UV absorption wavelength.

The heating device 500 according to a sixteenth embodiment of the present disclosure is described with reference to FIG. 30.

Figure 30:
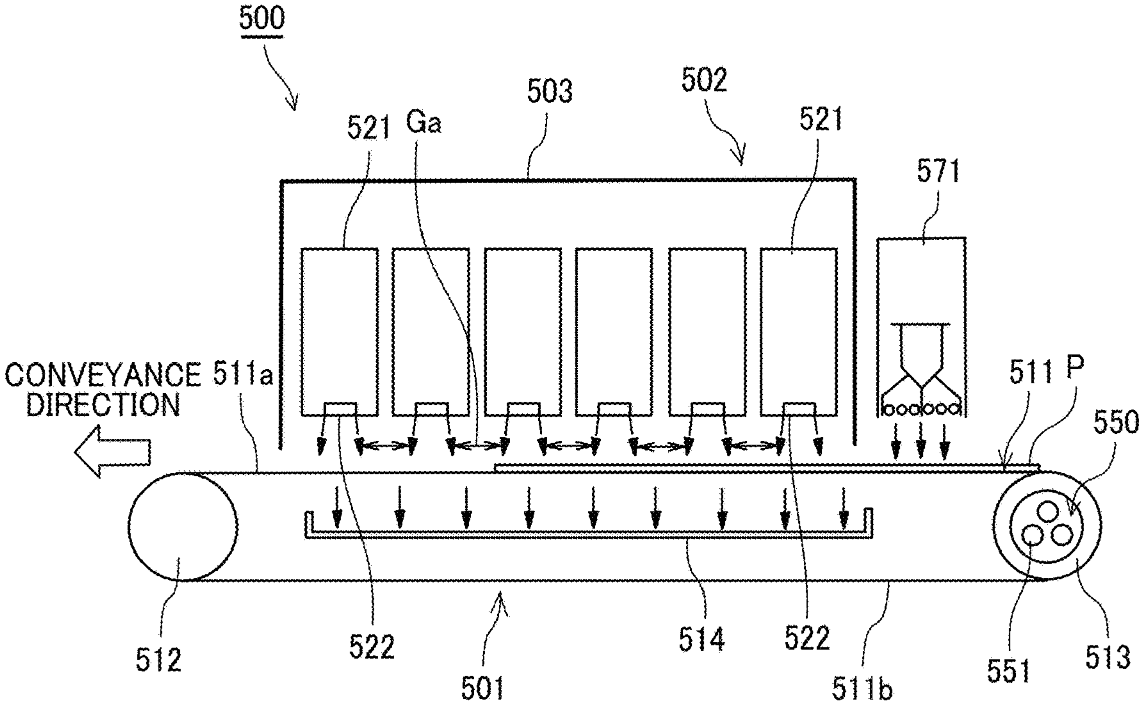
FIG. 30 is a schematic cross-sectional side view of the heating device according to a sixteenth embodiment of the present disclosure.

FIG. 30 is a schematic cross-sectional side view of the heating device 500 according to the sixteenth embodiment of the present disclosure.

The first heater 502 of the heating device 500 according to the sixteenth embodiment includes the infrared irradiator 571 and ultraviolet irradiators 521. The infrared irradiator 571 is arranged upstream of the ultraviolet irradiators 521 in the conveyance direction of the sheet P as indicated by arrow in FIG. 30.

The infrared irradiator 571 includes an infrared heater. The infrared heater irradiates infrared light having a peak wavelength in an infrared region (about 1.5 μm to 1000 μm) excluding the near infrared region. The ultraviolet irradiators 521 irradiate the sheet P conveyed by the conveyance mechanism 501 with ultraviolet rays to heat the sheet P.

The infrared irradiator 571 heats the sheet P to a degree in which the sheet P does not wrinkle. Therefore, the infrared heater arranged upstream of the ultraviolet irradiators 521 in the conveyance direction can increase the temperature of the sheet P before the sheet P enters and faces the ultraviolet irradiators 521. Thus, the heating device 500 can accelerate drying of the ink on the sheet P with the ultraviolet irradiators 521 arranged downstream of the infrared irradiator 571 in the conveyance direction of the sheet P.

Further, the sheet P having a relatively large heat capacity and a thickness tends to be less likely to wrinkle when the sheet P is heated by the infrared irradiator 571 than a thin sheet P. Thus, the heating device 500 may control time and output of heating by the infrared irradiator 571 according to a thickness of the sheet P.

The heating device 500 according to a seventeenth embodiment of the present disclosure is described with reference to FIG. 31.

Figure 31:
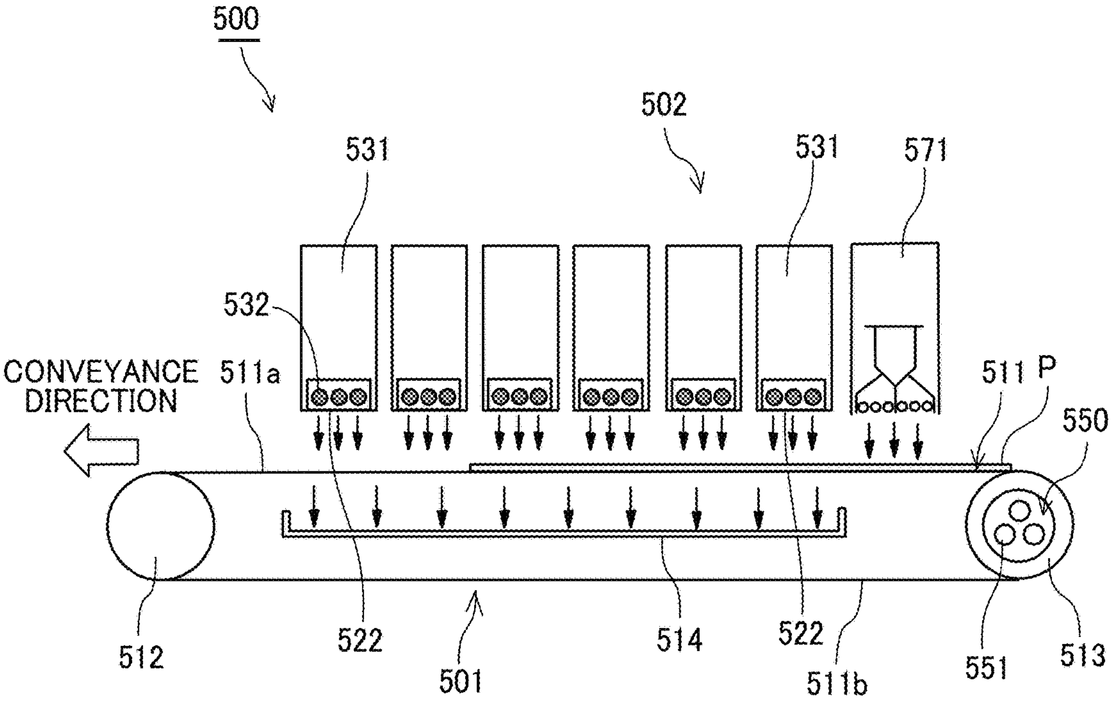
FIG. 31 is a schematic cross-sectional side view of the heating device according to a seventh embodiment of the present disclosure.

FIG. 31 is a schematic cross-sectional side view of the heating device 500 according to the seventeenth embodiment of the present disclosure.

The first heater 502 of the heating device 500 according to the seventeenth embodiment includes the infrared irradiator 571 and the infrared irradiators 531. The infrared irradiator 571 is arranged upstream of the infrared irradiators 531 in the conveyance direction of the sheet P as indicated by arrow in FIG. 31.

The infrared irradiator 571 includes an infrared heater. The infrared heater irradiates infrared light having a peak wavelength in an infrared region (about 1.5 μm to 1000 μm) excluding the near infrared region. Each of the infrared irradiator 531 includes the near infrared (NIR) heater 532.

The NIR heater 532 emits the infrared ray having the peak wavelength in the near infrared region (about 0.78 μm to 1.5 μm).

The infrared irradiator 571 heats the sheet P to a degree in which the sheet P does not wrinkle. Therefore, the infrared irradiator 571 arranged upstream of the infrared irradiators 531 in the conveyance direction can increase the temperature of the sheet P before the sheet P enters and faces the NIR heaters 532 of the infrared irradiators 531. Thus, the heating device 500 can accelerate drying of the ink on the sheet P with the infrared irradiators 531 arranged downstream of the infrared irradiator 571 in the conveyance direction of the sheet P.

Further, the sheet P having a relatively large heat capacity and a thickness tends to be less likely to wrinkle when the sheet P is heated by the infrared irradiator 571 than a thin sheet P. Thus, the heating device 500 may control time and output of heating by the infrared irradiator 571 according to a thickness of the sheet P.

The heating device 500 according to an eighteenth embodiment of the present disclosure is described with reference to FIG. 32.

Figure 32:
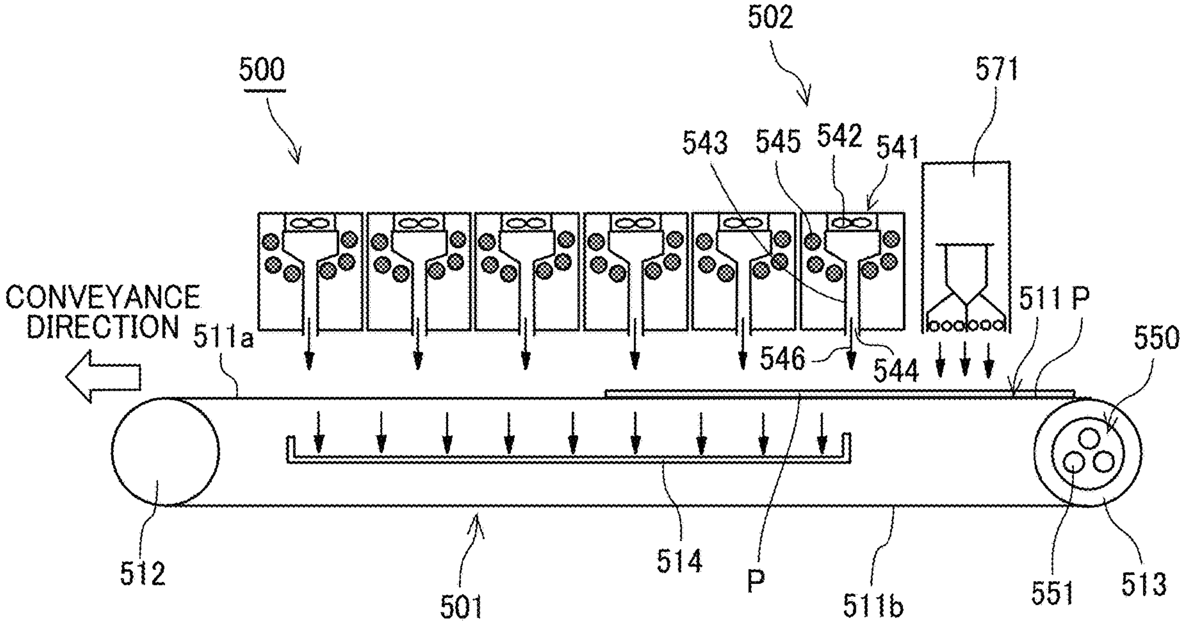
FIG. 32 is a schematic cross-sectional side view of the heating device according to an eighteenth embodiment of the present disclosure.

FIG. 32 is a schematic cross-sectional side view of the heating device 500 according to the eighteenth embodiment of the present disclosure.

The first heater 502 of the heating device 500 according to the eighteenth embodiment includes the infrared irradiator 571 and the air blowers 541. The infrared irradiator 571 is arranged upstream of the air blowers 541 in the conveyance direction of the sheet P as indicated by arrow in FIG. 32.

The infrared irradiator 571 includes an infrared heater. The infrared heater irradiates infrared light having a peak wavelength in an infrared region (about 1.5 μm to 1000 μm) excluding the near infrared region. The air blower 541 includes the fan 542, the channel member 543, the nozzle 544, and the infrared heater 545. The fan 542 sucks air outside the heating device 500. The nozzle 544 is also referred to as a "blowout port."

The infrared irradiator 571 heats the sheet P to a degree in which the sheet P does not wrinkle. Therefore, the infrared irradiator 571 arranged upstream of air blowers 541 in the conveyance direction can increase the temperature of the sheet P before the sheet P enters and faces the air blowers 541. Thus, the heating device 500 can accelerate drying of the ink on the sheet P with the air blowers 541 arranged downstream of the infrared irradiator 571 in the conveyance direction of the sheet P.

Further, the sheet P having a relatively large heat capacity and a thickness tends to be less likely to wrinkle when the sheet P is heated by the infrared irradiator 571 than a thin sheet P. Thus, the heating device 500 may control time and output of heating by the infrared irradiator 571 according to a thickness of the sheet P.

The heating device 500 according to a nineteenth embodiment of the present disclosure is described with reference to FIG. 33.

Figure 33:
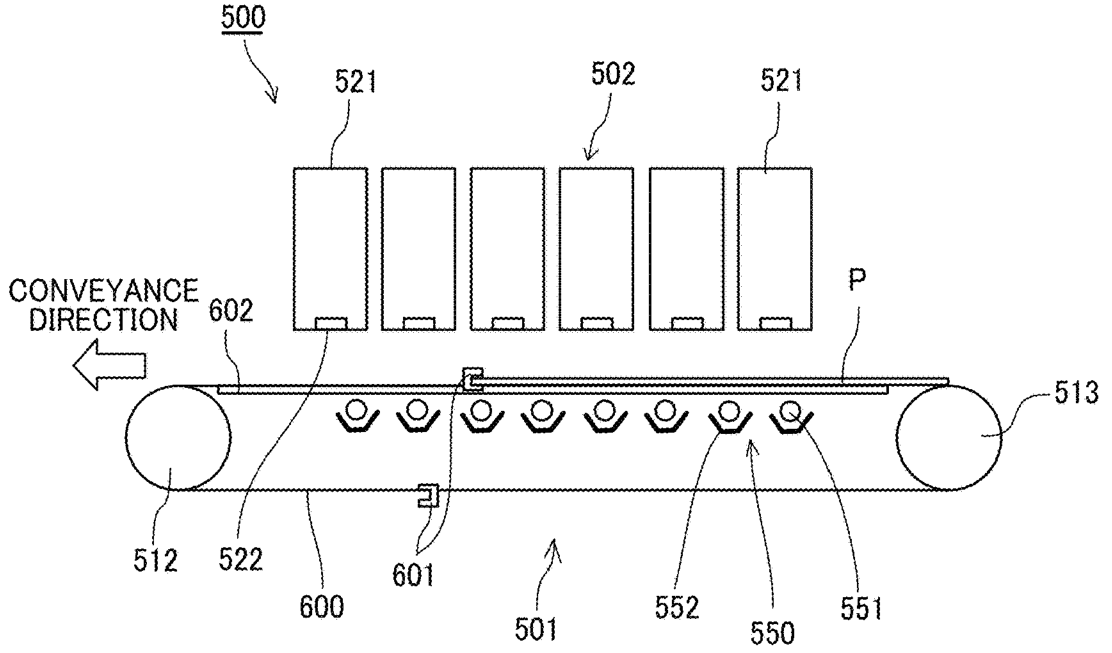
FIG. 33 is a schematic cross-sectional side view of the heating device according to a nineteenth embodiment of the present disclosure.

FIG. 33 is a schematic cross-sectional side view of the heating device 500 according to the nineteenth embodiment of the present disclosure.

The heating device 500 includes the conveyance mechanism 501 to convey the sheet P according the nineteenth embodiment is different from each of the conveyance mechanism 501 of the above-described embodiments. Although the first heater 502 includes the ultraviolet irradiator 521 in this nineteenth embodiment, the first heater 502 as described in the above embodiments may be applied to the present embodiment.

The conveyance mechanism 501 as a conveyor according to the nineteenth embodiment includes a chain 600 stretched between the drive roller 512 and the driven roller 513 and a gripper 601 fixed to the chain 600. The chain 600 orbits and rotates to move the chain 600. The gripper 601 grips a leading end of the sheet P to convey the sheet P.

The heating device 500 includes a conveyance guide 602 serving as a guide to support a lower surface of the sheet P conveyed by the conveyance mechanism 501. The heating device 500 includes the heating elements 551 inside the chain 600 to face the conveyance guide 602 so that the heating elements 551 can directly heat the conveyance guide 602.

The conveyance guide 602 is made of members that can store heat. The conveyance guide 602 is heated by the heating element 551 so that the conveyance guide 602 transfers heat to the sheet P in contact with the conveyance guide 602.

The conveyance guide 602 and the heating element 551 function as a second heater 550.

The pigment in the liquid (ink) generates heat while the temperature of the sheet P increases due to heat transferred from the conveyance guide 602. Thus, the heating device 500 can efficiently heat the ink (liquid) applied onto the sheet P.

The heating device 500 according to a twentieth embodiment of the present disclosure is described with reference to FIG. 34.

Figure 34:
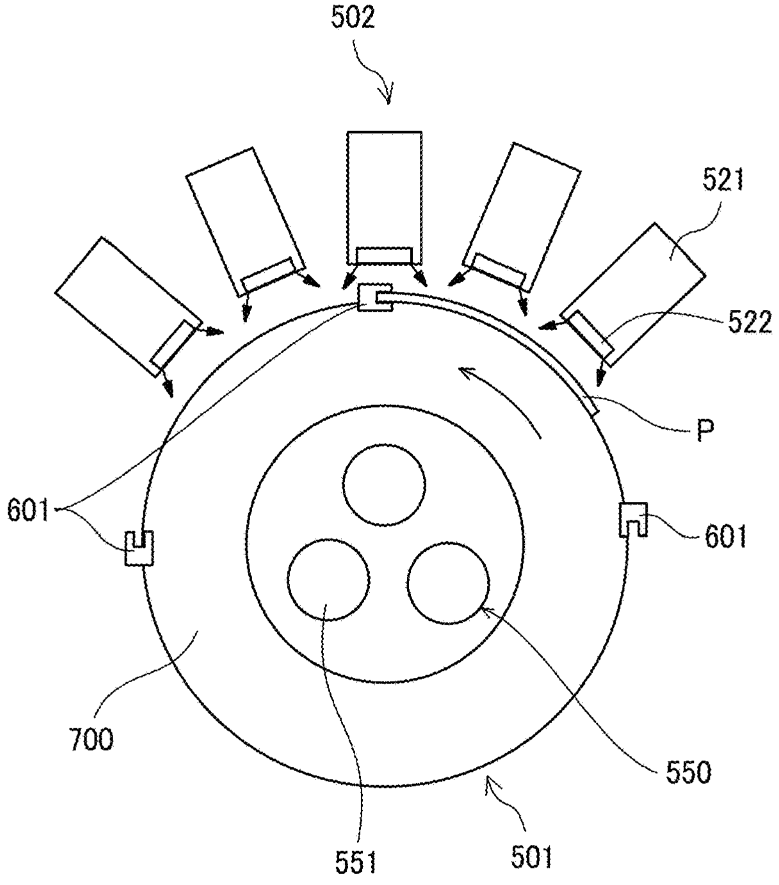
FIG. 34 is a schematic cross-sectional side view of the heating device according to a twentieth embodiment of the present disclosure.

FIG. 34 is a schematic cross-sectional side view of the heating device 500 according to the twentieth embodiment of the present disclosure.

The heating device 500 includes the conveyance mechanism 501 to convey the sheet P according the nineteenth embodiment is different from each of the conveyance mechanism 501 of the above-described embodiments. Although the first heater 502 includes the ultraviolet irradiator 521 in this nineteenth embodiment, the first heater 502 as described in the above embodiments may be applied to the present embodiment.

The heating device 500 according to the twentieth embodiment includes the conveyance mechanism 501 as a conveyor that includes a cylindrical conveyance drum 700 and the gripper 601. The gripper 601 pinches the leading end of the sheet P, and the conveyance drum 700 rotates to convey the sheet P gripped by the gripper 601.

A surface of the conveyance drum 700 is a guide that supports the lower surface of the sheet P to be conveyed. The conveyance drum 700 is made of members that can store heat. The conveyance drum 700 is heated by the heating element 551 so that the conveyance drum 700 can transfer heat to the sheet P in contact with the surface of the conveyance drum 700.

The conveyance drum 700 and the heating element 551 function as the second heater 550.

In this way, the heating device 500 can efficiently heat the ink on the sheet P since the pigment in the liquid (ink) generates heat while the temperature of the sheet P rises by the heat transferred from a surface of the conveyance drum 700 to the sheet P.

In the present embodiments, a "liquid" discharged from the head is not particularly limited as long as the liquid has a viscosity and surface tension of degrees dischargeable from the head.

Preferably, the viscosity of the liquid is not greater than 30 mPa s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Further, the water-based pigment ink is not limited to above-mentioned embodiments.

The water-based pigment ink may contain an ultraviolet polymerization initiator and an ultraviolet polymerizable compound.

In this case, the water-based pigment ink preferably contains the ultraviolet polymerization initiator and the ultraviolet polymerizable, content of which does not cause or hardly cause curing due to a polymerization reaction even when the first heater irradiates the water-based pigment ink with light.

Specifically, the content of the ultraviolet polymerization initiator in an ink composition is less than 0.10% by mass, or the content of the ultraviolet polymerizable compound in the ink composition is less than 5% by mass.

Such a configuration of the water-based pigment ink can reduce a running cost and obtain a printed matter having good safety.

The polymerizable compound may be a monomer or an oligomer.

Examples of the polymerizable compound include methacrylic acid.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid to materials to which liquid can adhere, but also apparatuses to discharge a liquid toward gas or into a liquid.

The "liquid discharge apparatus" may include devices to feed, convey, and eject the material on which liquid can adhere.

The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink.

The liquid discharge apparatus is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material onto which liquid at least temporarily adheres, a material onto which liquid adheres and fixes, or a material onto which liquid adheres to permeate.

Examples of the "material onto which liquid can adhere" include recording media such as a paper sheet, recording paper, and a recording sheet of paper, film, and cloth, electronic components such as an electronic substrate and a piezoelectric element, and media such as a powder layer, an organ model, and a testing cell.

The "material onto which liquid can adhere" includes any material on which liquid adheres unless particularly limited.

Examples of the "material onto which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material onto which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation," "recording," "printing," "image printing," and "fabricating" used herein may be used synonymously with each other.

Each of the functions of the described embodiments such as the heat controller 801 and the drying controller 901 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A heating device comprising:

a conveyor configured to convey a sheet having a first surface on which a liquid is applied and a second surface contacting the conveyor;

a first heater including a plurality of ultraviolet irradiators arranged in a housing along a conveyance direction of the sheet, and configured to irradiate the first surface of the sheet with ultraviolet light; and a second heater configured to heat the conveyor;

wherein an ultraviolet irradiator of the plurality of ultraviolet irradiators includes:

ultraviolet-light emitting diode elements arranged in a grid pattern on an irradiation surface of the ultraviolet irradiator.

2. The heading device according to claim 1, wherein the ultraviolet-light emitting diode elements are configured to emit the ultraviolet light at a substantially identical illuminance.

3. The heating device according to claim 1, wherein the ultraviolet-light emitting diode elements are configured to emit the ultraviolet light having a peak wavelength of about 400 nanometers.

4. The heating device according to claim 1, further comprising:
an infrared irradiator arranged upstream of the plurality of ultraviolet irradiators in the conveyance direction.

5. The heating device according to claim 1, further comprising:
an air blower arranged upstream of the plurality of ultraviolet irradiators in the conveyance direction.

6. The heating device according to claim 1, further comprising:
a fan, a channel, and a nozzle on a side surface of the ultraviolet irradiator,
wherein the fan is configured to suck air from an exterior of the heating device, and the channel is used to blow the air upstream in the conveyance direction from the nozzle as an airflow.

7. The heating device according to claim 1, wherein the second heater is configured to heat a back surface of the conveyor upstream from the plurality of ultraviolet irradiators in the conveyance direction.

8. The heating device according to claim 1, wherein the conveyor includes:
an endless belt;
a drive roller configured to rotate the endless belt; and
a driven roller configured to be driven by the drive roller,
wherein the second heater is configured to heat the driven roller.

9. The heating device according to claim 8, wherein the second heater is inside the driven roller.

10. The heating device according to claim 8, wherein the second heater is outside of and adjacent to the driven roller.

11. The heating device according to claim 10, wherein the second heater includes:
a heating element configured to generate heat; and
a reflector configured to reflect the heat generated by the heating element to the driven roller.

12. The heating device according to claim 1, wherein the conveyor includes;
an endless belt;
a drive roller configured to rotate the endless belt; and
a driven roller configured to be driven by the drive roller,
wherein the second heater is inside a loop of the endless belt and is configured to heat an inner surface of the endless belt.

13. The heating device according to claim 12, wherein the endless belt includes:
a forward portion facing the first heater; and
a backward portion opposite to the forward portion with respect to the drive roller and the driven roller,
wherein the second heater is configured to heat both the forward portion and the backward portion of the endless belt.

14. The heating device according to claim 13, wherein the second heater includes:
a heating element configured to generate heat; and
a reflector configured to reflect the heat generated by the heating element to the endless belt.

15. The heating device according to claim 12, wherein the endless belt heats the second surface of the sheet, and the ultraviolet irradiators heat the first surface of the sheet.

16. The heating device according to claim 1, wherein the liquid contains water or an organic solvent.

17. The heating device according to claim 1, wherein the liquid contains an ultraviolet polymerization initiator, and an ultraviolet polymerizable compound.

18. The heating device according to claim 17, wherein a content of the ultraviolet polymerization initiator in the liquid is less than 0.1% by mass, or a content of the ultraviolet polymerizable compound in the liquid is less than 5% by mass.

19. A liquid discharge apparatus comprising:
a liquid discharge head configured to discharge the liquid onto the sheet; and
the heating device according to claim 1.

20. A printer comprising:
a liquid discharge head configured to discharge a liquid onto a sheet to form an image; and
a heating device disposed downstream from the liquid discharge head;
the heating device comprising:
a conveyor configured to convey the sheet having a first surface on which the liquid is applied and a second surface contacting the conveyor;
a first heater including a plurality of ultraviolet irradiators arranged in a housing along a conveyance direction of the sheet, and configured to irradiate the first surface of the sheet with ultraviolet light; and
a second heater configured to heat the conveyor;
wherein an ultraviolet irradiator of the plurality of ultraviolet irradiators includes:
ultraviolet-light emitting diode elements arranged in a grid pattern on an irradiation surface of the ultraviolet irradiator.

21. The printer according to claim 20, wherein the ultraviolet-light emitting diode elements are configured to emit the ultraviolet light at a substantially identical illuminance.

* * * * *